United States Patent
Iwadate

(10) Patent No.: US 7,095,515 B2
(45) Date of Patent: Aug. 22, 2006

(54) IMAGE PROCESSING APPARATUS AND IMAGE PROCESSING METHOD

(75) Inventor: Masahiro Iwadate, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1002 days.

(21) Appl. No.: 09/905,884

(22) Filed: Jul. 17, 2001

(65) Prior Publication Data

US 2002/0018230 A1 Feb. 14, 2002

(30) Foreign Application Priority Data

Jul. 21, 2000 (JP) .............................. 2000/220525

(51) Int. Cl.
  *G06K 1/00* (2006.01)
  *G06F 15/00* (2006.01)
(52) U.S. Cl. .................... 358/1.14; 358/1.15; 358/1.16
(58) Field of Classification Search ............... 358/1.15, 358/1.9, 1.16, 1.14, 1.1, 1; 400/61, 76; 355/40; 700/28; 347/7, 1
See application file for complete search history.

(56) References Cited

U.S. PATENT DOCUMENTS

| | | | | |
|---|---|---|---|---|
| 5,630,032 A | * | 5/1997 | Yamaguchi et al. ....... | 358/1.16 |
| 5,774,356 A | * | 6/1998 | Hisatake et al. ............... | 700/28 |
| 5,873,659 A | * | 2/1999 | Edwards et al. ............... | 400/61 |
| 6,160,629 A | * | 12/2000 | Tang et al. .................... | 358/1.1 |
| 6,234,597 B1 | * | 5/2001 | Suzuki et al. .................. | 347/7 |
| 6,317,193 B1 | * | 11/2001 | Funahashi ..................... | 355/40 |
| 6,545,766 B1 | * | 4/2003 | Shima et al. ............... | 358/1.14 |
| 6,597,469 B1 | * | 7/2003 | Kuroyanagi ............... | 358/1.15 |
| 6,606,163 B1 | * | 8/2003 | Suzuki et al. .............. | 358/1.15 |
| 6,623,190 B1 | * | 9/2003 | Lutz ............................ | 400/76 |
| 6,674,545 B1 | * | 1/2004 | Atsumi ........................ | 358/1.9 |
| 2002/0012129 A1 | * | 1/2002 | Amemiya .................. | 358/1.14 |

FOREIGN PATENT DOCUMENTS

JP  9-272246  10/1997
JP  11-136414  5/1999

* cited by examiner

*Primary Examiner*—Kimberly Williams
*Assistant Examiner*—Satwant Singh
(74) *Attorney, Agent, or Firm*—Fitzpatrick, Cella, Harper & Scinto

(57) ABSTRACT

When the printing operation of a printer is restricted during the execution of a print job including print data of a plurality of pages, an image processing apparatus of the invention executes a retreat mode for storing image data obtained by developing the print data of the subsequent pages in which the printing operation has been restricted into an image memory. When a status to be restricted is cancelled, the printing operation is restarted by using the image data retreated into the image memory.

7 Claims, 20 Drawing Sheets

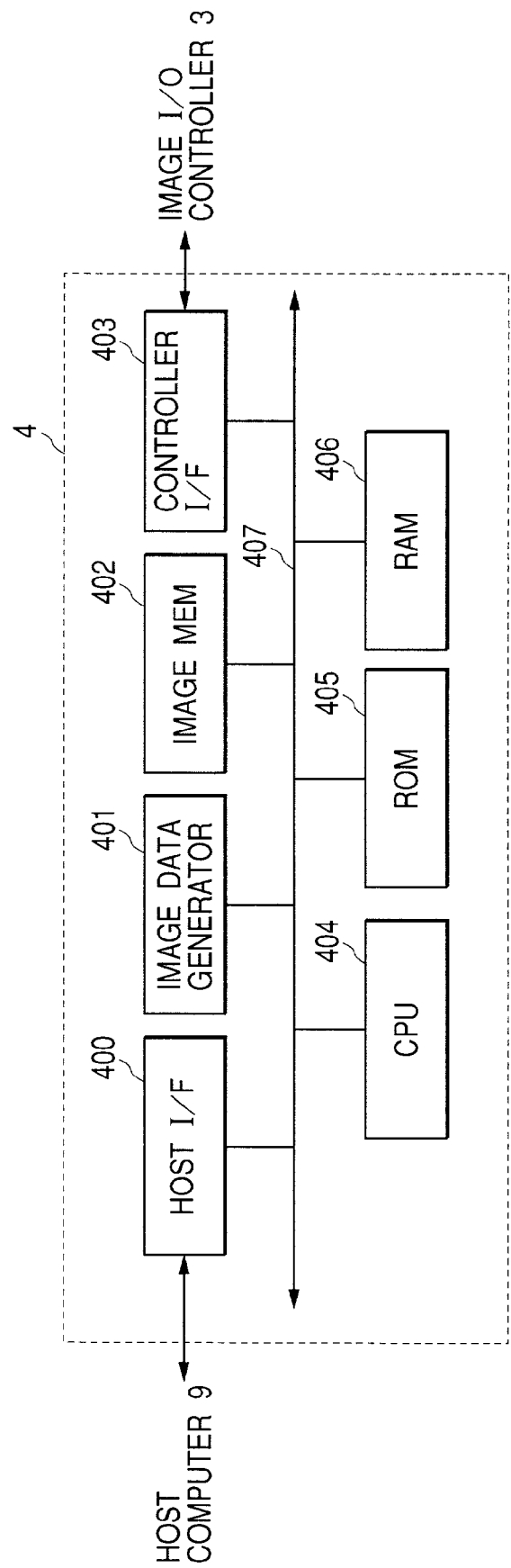

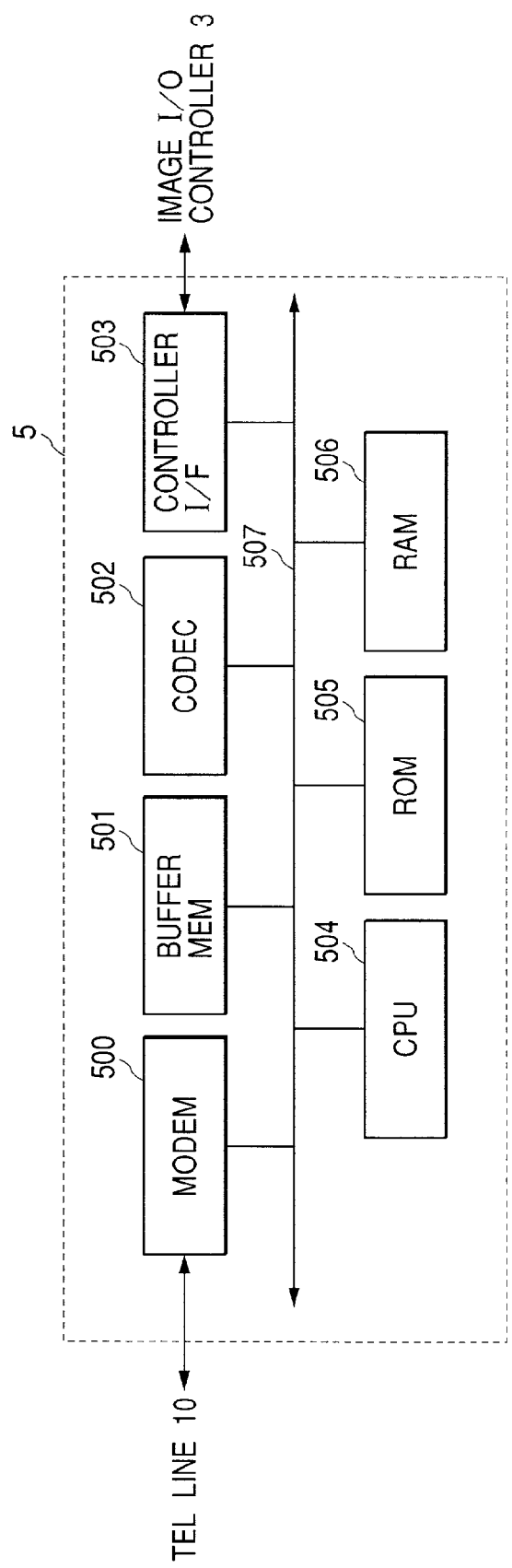

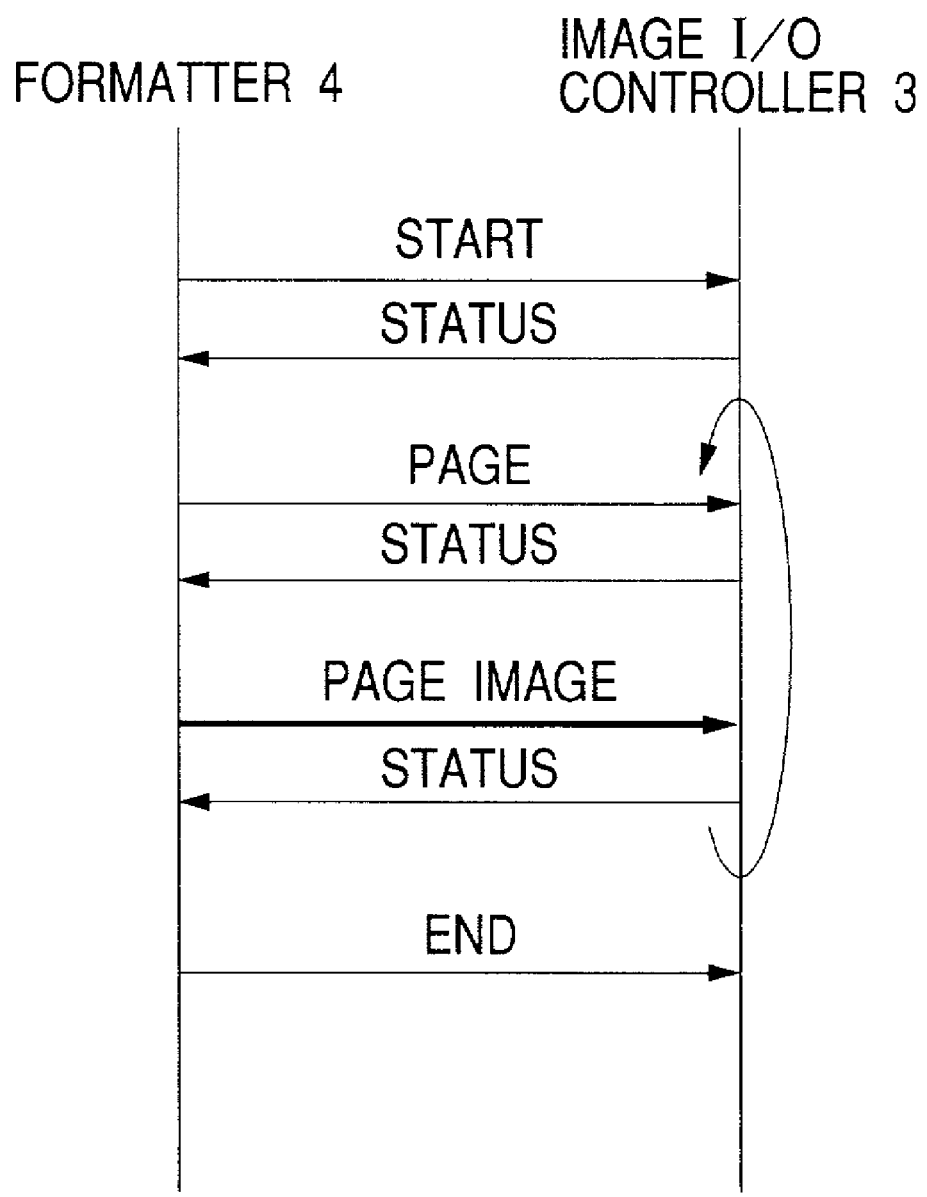

FIG. 8A

| START |
|---|
| JOB NO. |
| JOBNAME |
| USERNAME |
| PRINT MODE |

FIG. 8B

| PAGE |
|---|
| JOB NO. |
| PAGE NO. |
| PAGE SIZE |

FIG. 8C

| END |
|---|
| JOB NO. |
| COMPLETION STATUS |

FIG. 8D

| STATUS |
|---|
| KIND OF STATUS |
| STATUS |
| DETAIL STATUS |

FIG. 15

| ID |
|---|
| JOB NO. |
| JOBNAME |
| USERNAME |
| PAGES (S) |
| ADDRESS |

FIG. 16

RETREAT JOB LIST

| ID | JOBNAME | USER | PAGE (S) |
|---|---|---|---|
| 1234 | SAMPLE. TXT | SUZUKI | 5 |
|  |  |  |  |

PRINT    DELETE

IMAGE PROCESSING APPARATUS AND IMAGE PROCESSING METHOD

BACKGROUND OF THE INVENTION

1. Field of the Invention

The invention relates to an image processing apparatus having developing means for developing print data into image data which can be print-processed and printing means for printing an image shown by the image data developed by the developing means onto a paper and also relates to an image processing method which is used for such an apparatus.

2. Related Background Art

Hitherto, in an office or the like, there has been performed an operation administration such that the number of papers which are outputted from an image processing apparatus such as printer, copying machine, or the like is limited every division.

For example, in the printer, by controlling in a manner such that when the accumulated number of print papers reaches the preset maximum number of print papers, the subsequent printing operation is stopped, the operation administration of the printer is executed.

However, in the conventional printer, if the accumulated number of print papers reaches the preset maximum number of print papers, the subsequent printing operation is stopped. Therefore, for example, if the printing operation is stopped during the execution of a print job including print data of a plurality of pages, a print output of the print data of the subsequent pages is not derived. In such a case, in order to print and output images of the remaining pages, it is necessary for the user to execute again processes such that after the stop of the operation is cancelled, the print data of the print job is sent again and the print data is developed into bit map data, so that it is troublesome and inconvenient.

SUMMARY OF THE INVENTION

It is an object of the invention to provide an image processing apparatus and an image processing method, in which it is possible to restart the printing of image data obtained by developing print data of subsequent pages in which the printing operation is restricted without any troublesomeness.

According to the invention, there is provided an image processing apparatus having developing means for developing print data into image data which can be print-processed and printing means for printing an image shown by the image data developed by the developing means onto a paper, comprising: memory means for storing the image data; restricting means for restricting the printing operation of the printing means when a predetermined condition is satisfied; and control means for controlling in a manner such that when the printing operation of the printing means is restricted by the restricting means during the execution of a print job including the print data of a plurality of pages, the image data obtained by developing the print data of subsequent pages in which the printing operation has been restricted is stored into the memory means.

The above and other objects and features of the present invention will become apparent from the following detailed description and the appended claims with reference to the accompanying drawings.

BRIEF DESCRIPTION OF THE DRAWINGS

FIG. 5 is a block diagram showing a construction of a formatter 4 in the image processing apparatus in FIG. 1;

FIG. 6 is a block diagram showing a construction of a facsimile 5 in the image processing apparatus in FIG. 1;

FIG. 7 is a diagram showing an image input sequence of the formatter 4 and image I/O controller 3 in the image processing apparatus in FIG. 1;

FIGS. 8A, 8B, 8C and 8D are diagrams showing control commands which are transmitted and received between the formatter 4 and image I/O controller 3 in the image processing apparatus in FIG. 1 and their data constructions;

FIG. 15 is a diagram showing a construction of a retreat job table;

FIG. 16 is a diagram showing an example of a retreat job list picture plane which is displayed on an operation unit 6 in the image processing apparatus in FIG. 1;

DETAILED DESCRIPTION OF THE PREFERRED EMBODIMENTS

Embodiments of the present invention will now be described hereinbelow with reference to the drawings.

First Embodiment

Figure 1:
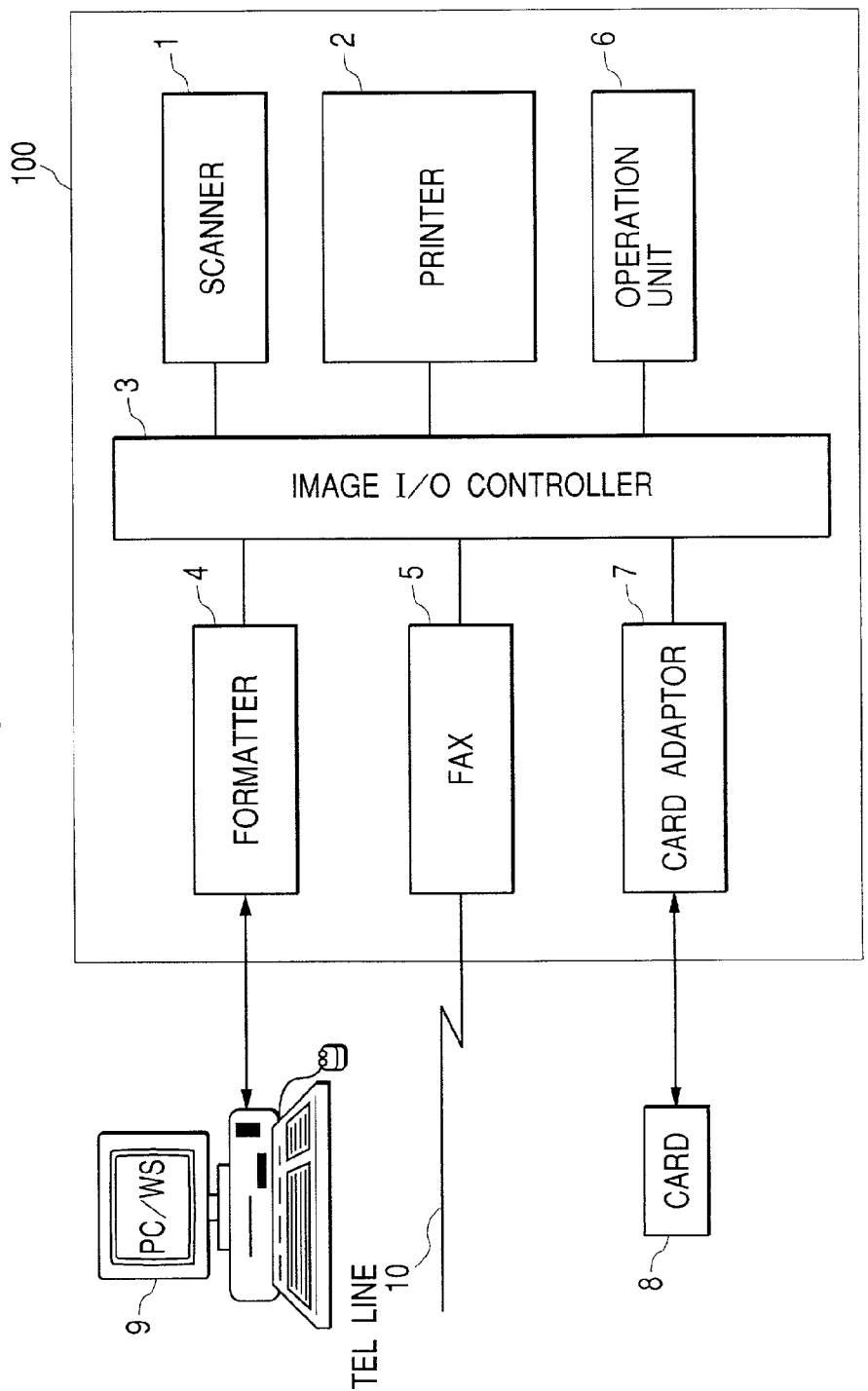
FIG. 1 is a block diagram showing a construction of an image processing apparatus according to the first embodiment of the invention.

FIG. 1 is a block diagram showing a construction of an image processing apparatus according to the first embodiment of the invention.

As shown in FIG. 1, an image processing apparatus 100 comprises a hybrid apparatus having a scanner function, a printer function, and a facsimile function and has an image input/output (I/O) controller 3. The image I/O controller 3 controls a flow of data among a scanner 1, a printer 2, a formatter 4, a facsimile 5, an operation unit 6, and a card adaptor 7 and also functions as a main controller for integrally controlling them.

The scanner 1 reads an image of an original and outputs image data according to the original image to the printer 2 and image I/O controller 3.

The printer 2 records an image according to the image data from the scanner 1 and image I/O controller 3 onto a recording paper.

The formatter 4 receives code data indicative of an image transferred from a host computer 9 comprising a personal computer, a workstation, or the like and develops the received code data into image data which can be processed in the printer 2.

The facsimile 5 decompresses compressed image data received through a telephone (TEL) line 10, transfers the decompressed image data to the image I/O controller 3, compresses the image data transferred from the image I/O controller 3, and transmits the compressed image data through the TEL line 10.

The operation unit 6 has a display panel and various keys. An operation setting picture plane or the like which is used by the user to perform various setting operations in accordance with the control of the image I/O controller 3 is displayed on the display panel. The various keys are used for inputting various setting contents, or the like. A corresponding key signal is generated in accordance with the operation of each key and transferred to the image I/O controller 3.

The card adaptor 7 is constructed in a manner such that a control card 8 can be attached or detached into/from the adaptor 7 and has functions for detecting the mounting or removal of the control card 8 and notifying the image I/O controller 3 of a result of the detection. The card adaptor 7 controls the reading and writing operations of information from/into the mounted control card 8. An administration division ID which has been set for the user who uses the image processing apparatus 100 and the maximum number of print papers have been recorded in the control card 8. The number of accumulated print papers outputted by the user by using the image processing apparatus 100 can be also recorded in the control card 8. The accumulated number of print papers is a value counted by the image I/O controller 3 every administration division ID.

Figure 2:
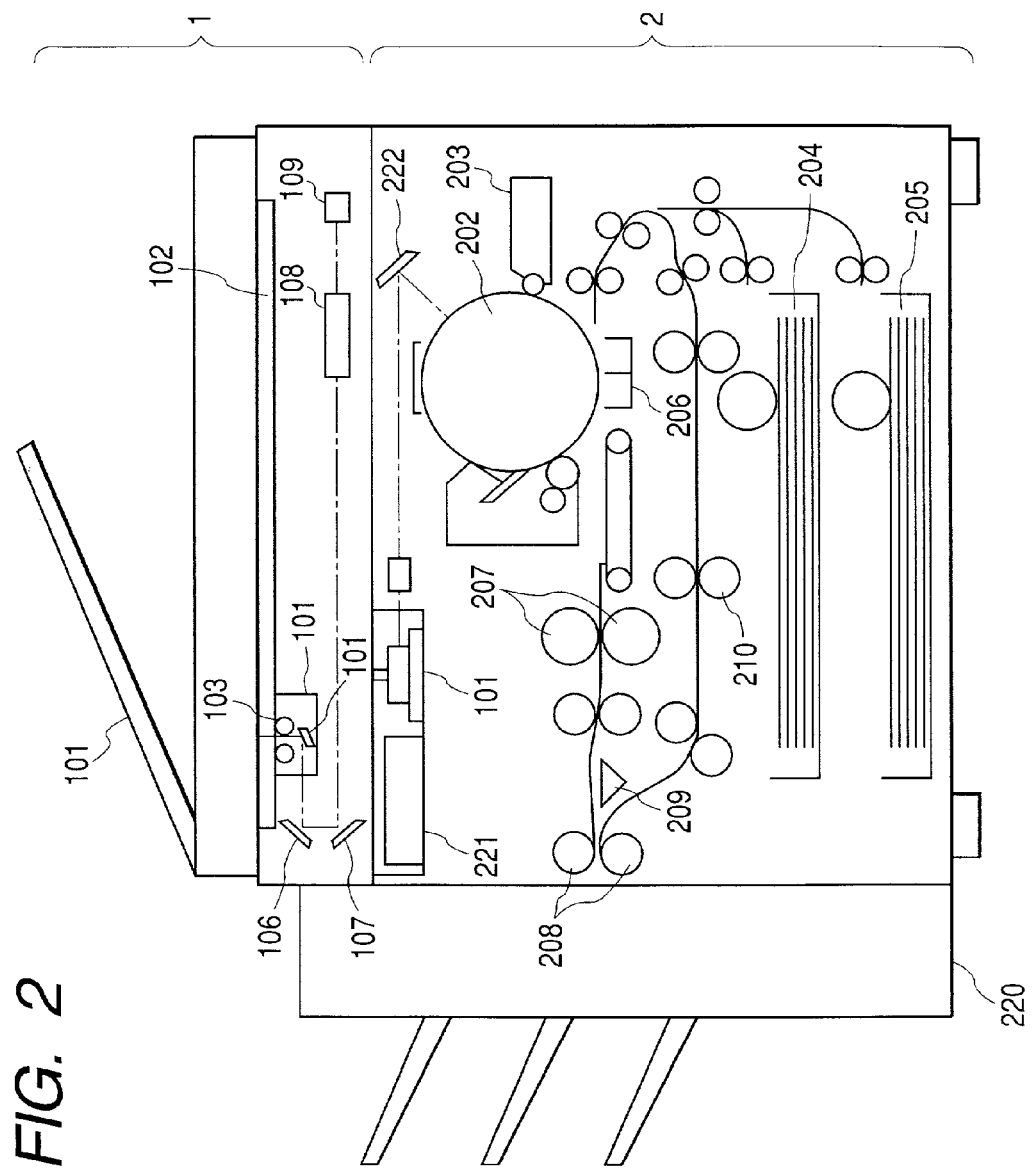
FIG. 2 is a cross-sectional view showing constructions of a scanner 1 and a printer 2 in the image processing apparatus in FIG. 1.

Subsequently, constructions of the scanner 1 and printer 2 will be described with reference to FIG. 2. FIG. 2 is a cross-sectional view showing the constructions of the scanner 1 and printer 2 in the image processing apparatus in FIG. 1.

As shown in FIG. 2, a document feeder 101 is mounted on the scanner 1. The document feeder 101 sequentially feeds the originals onto a platen glass 102 one by one from the last page and delivers the original on the platen glass 102 after completion of the reading operation of the original.

When the original is conveyed onto the platen glass 102, a lamp 103 is lit on and the movement of a scanner unit 104 is started. The original is exposed and scanned by the movement of the scanner unit 104. Reflection light from the original upon exposure scanning is guided onto a CCD image sensor (hereinafter, referred to as a CCD) 109 through mirrors 105, 106, and 107 and a lens 108. The image of the original scanned as mentioned above is read by the CCD 109. The CCD 109 photoelectrically converts the optically read image into image data and outputs it. The image data outputted from the CCD 109 is subjected to predetermined processes and, thereafter, the processed image data is transferred to the printer 2 and image I/O controller 3 through a video bus (not shown).

In the printer 2, the image data outputted from the scanner 1 or the image data outputted from the image I/O controller 3 is inputted to a laser driver 221. The laser driver 221 drives a laser emitter 201 on the basis of the inputted image data. That is, the laser driver 221 drives the laser emitter 201 so as to emit a laser beam according to the image data outputted from the scanner 1. The laser beam is irradiated onto a photosensitive drum 202 through a reflecting mirror 222 while being scanned. An electrostatic latent image according to the laser beam is formed on the photosensitive drum 202.

The electrostatic latent image on the photosensitive drum 202 is visualized as a development image by a developing agent which is supplied from a developing unit 203. At timing synchronized with the start of the irradiation of the laser beam, a recording paper is fed from either a cassette 204 or a cassette 205 through a pickup roller. The recording paper is fed to a gap between the photosensitive drum 202 and a transfer unit 206 by a resist roller. The development image formed on the photosensitive drum 202 is transferred onto the fed recording paper by the transfer unit 206.

The recording paper onto which the development image has been transferred is conveyed to a fixing unit (heating roller and pressing roller) 207 by a conveying belt. The fixing unit 207 thermally presses the recording paper, thereby fixing the development image onto the recording paper. The recording paper which passed through the fixing unit 207 is delivered to a sorter 220 by delivery rollers 208.

The sorter 220 encloses the delivered recording paper onto a corresponding bin, thereby sorting the recording paper. If a sorting mode is not set, the sorter 220 encloses the recording paper onto the top bin. If a both-side recording mode is set, the recording paper is conveyed to the position of the delivery rollers 208, thereafter, a rotating direction of the delivery rollers 208 is reversed, and the recording paper is guided to a re-feed conveying path 210 by a flapper 209. If a multiple recording mode is set, the flapper 209 is switched lest the recording paper is conveyed to the delivery rollers 208 and the recording paper is guided to the re-feed conveying path 210. The recording paper guided to the re-feed conveying path 210 is fed again to the gap between the photosensitive drum 202 and transfer unit 206 at the foregoing timing.

Figure 3:
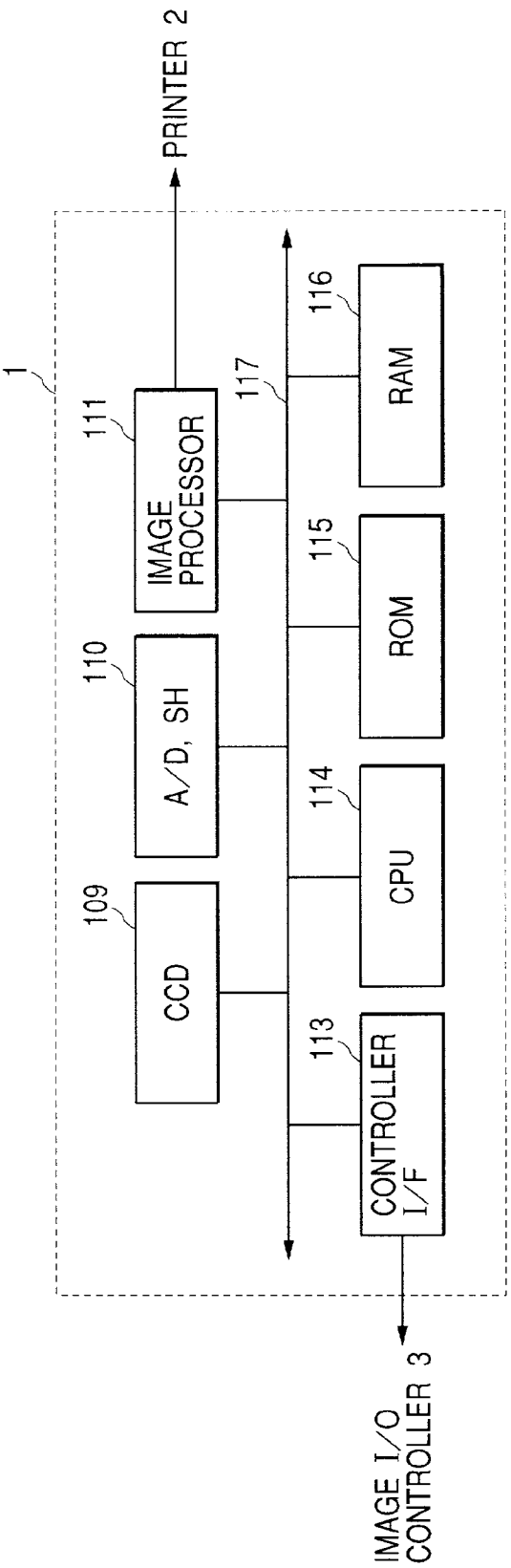
FIG. 3 is a block diagram showing the construction of the scanner 1 in the image processing apparatus in FIG. 1.

The construction of the scanner 1 will now be described with reference to FIG. 3. FIG. 3 is a block diagram showing the construction of the scanner 1 of the image processing apparatus in FIG. 1.

As shown in FIG. 3, the image data outputted from the CCD 109 is converted into digital data by analog/digital conversion by an A/D•SH unit 110 and the digital data is subjected to a shading correction. The image data processed by the A/D•SH unit 110 is transferred to the printer 2 through an image processor 111 and transferred to the image I/O controller 3 through a controller I/F (interface unit) 113. The image processor 111 executes various image processes such as a trimming process and the like. The image processor 111 and controller I/F 113 are controlled by a CPU 114 in accordance with set contents set by the operation unit 6. This control is performed on the basis of an instruction from the image I/O controller 3. For example, if the control is set so as to execute a copy mode after the trimming process, in the image processor 111, the trimming process is executed to the image data processed by the A/D•SH unit 110. The trimming processed image data is transferred to the printer 2. If a facsimile transmitting mode is set in the operation unit 6, the image data and a control command according to the set mode are transferred from the controller I/F 113 to the image I/O controller 3.

As mentioned above, the CPU 114 controls the image processor 111 and controller I/F 113 and its control is executed in accordance with a control program stored in a ROM 115. Work areas for an arithmetic operation, processes, and the like of the CPU 114 are provided by a RAM 116.

Figure 4:
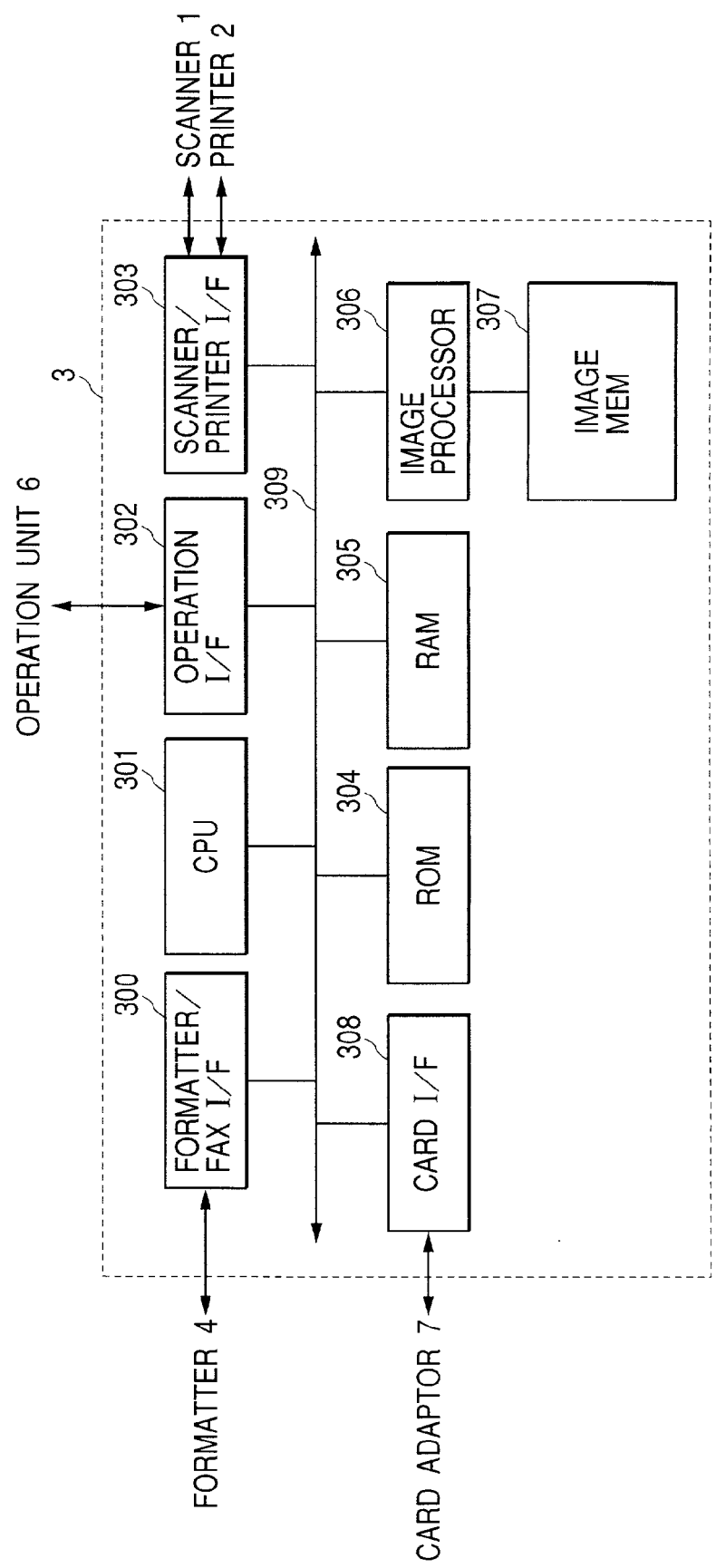
FIG. 4 is a block diagram showing a construction of an image input/output controller 3 in the image processing apparatus in FIG. 1.

The construction of the image I/O controller 3 will now be described with reference to FIG. 4. FIG. 4 is a block diagram showing the construction of the image I/O controller 3 of the image processing apparatus in FIG. 1.

As shown in FIG. 4, the image I/O controller 3 has: a scanner/printer I/F (interface unit) 303 for connecting the scanner 1 and printer 2; a formatter/FAX I/F 300 for connecting the formatter 4 and facsimile 5; an operation I/F 302 for connecting the operation unit 6; and a card I/F 308 for connecting the card adaptor 7. Those I/F units are connected to a CPU 301 through a CPU bus 309.

The image data transferred from the scanner 1 is transferred to an image processor 306 through the scanner/printer I/F 303 and, thereafter, stored into an image memory 307. The control command inputted from the scanner 1 is transferred to the CPU 301 through the scanner/printer I/F 303 and CPU bus 309.

The image data transferred from the formatter 4 or facsimile 5 is sent to the image processor 306 through the formatter/FAX I/F 300 and, thereafter, stored into the image memory 307. The control command inputted from the formatter 4 or facsimile 5 is transferred to the CPU 301 through the scanner/printer I/F 303 and CPU bus 309.

The detection signal which was transferred from the card adaptor 7 and indicates the mounting or removal of the control card 8 and the information read out from the control card 8 by the card adaptor 7 are transferred to the CPU 301 through the card I/F 308. Each time one paper is printed by the printer 2, the accumulated number of print papers is transferred to the card adaptor 7 through the card I/F 308 and written into the control card 8 by the card adaptor 7.

The image data stored in the image memory 307 is subjected to image processes such as rotating process, zooming process, and the like of the image by the image processor 306 in accordance with the control by the CPU 301 according to the control command inputted from the scanner 1, formatter 4, facsimile 5, or operation unit 6. After that, the processed image data is transferred to the printer 2 through the scanner/printer I/F 303 or to the facsimile 5 through the formatter/FAX I/F 300.

When a command for requesting a display to the operation unit 6 among the control commands inputted from the scanner 1, formatter 4, and facsimile 5 is received, the CPU 301 controls so as to transfer the designated display contents to the operation unit 6 through the operation I/F 302 and display them. When the operation is executed in the operation unit 6 by the user, information indicative of the operation is inputted to the CPU 301 through the operation I/F 302. The CPU 301 transfers the inputted operation information to the scanner 1, formatter 4, or facsimile 5 and controls the image input/output on the basis of the operation information.

As mentioned above, the CPU 301 performs a control such as an image I/O control or the like and the control is executed in accordance with a control program stored in a ROM 304. Work areas for an arithmetic operation, processes, and the like of the CPU 301 are provided by a RAM 305.

The construction of the formatter 4 will now be described with reference to FIG. 5. FIG. 5 is a block diagram showing the construction of the formatter 4 of the image processing apparatus in FIG. 1.

As shown in FIG. 5, the formatter 4 has: a host I/F 400 for connecting the host computer 9; a controller I/F 403 for connecting the image I/O controller 3; and a CPU 404 for connecting each I/F through a CPU bus 407.

PDL data (page description language data) transferred from the host computer 9 is transferred to a RAM 406 through the host I/F 400 and stored. The PDL data stored in the RAM 406 is read out and interpreted by the CPU 404. The interpreted data is transferred to an image data generator 401 through the CPU bus 407. The image data generator 401 converts data transferred from the CPU 404 into a bit map image. The bit map image is once stored into an image memory 402 by the CPU 404 and, thereafter, it is transferred to the image I/O controller 3 through the controller I/F 403. In this instance, the CPU 404 transfers control commands for instructing an output destination, output setting, and the like of an image.

A display picture plane and the setting information regarding the operation of the formatter 4 have been stored in a ROM 405 and the RAM 406. The CPU 404 reads them out as necessary and transfers them to the image I/O controller 3 through the controller I/F 403. The CPU 404 performs various controls on the basis of the operation information of the operation unit 6 transferred from the image I/O controller 3. For example, when the clearing operation of a reception buffer of the formatter 4 is executed in the operation unit 6, the CPU 404 is notified of such a fact from the image I/O controller 3. The CPU 404 clears the reception data stored in the RAM 406 in accordance with the contents of the notification from the image I/O controller 3.

The above control by the CPU 404 is executed in accordance with a control program stored in the ROM 405. The RAM 406 is used as work areas for an arithmetic operation, processes, and the like of the CPU 404.

The construction of the facsimile 5 will now be described with reference to FIG. 6. FIG. 6 is a block diagram showing the construction of the facsimile 5 in the image processing apparatus of FIG. 1.

As shown in FIG. 6, the facsimile 5 has: a modem (MODEM) 500 for connecting the TEL line 10; a controller I/F 503 for connecting the image I/O controller 3; and a CPU 504 for connecting the MODEM 500 and controller I/F 503 through a CPU bus 507.

The MODEM 500 demodulates the data which was facsimile received from the TEL line 10. The demodulated data is stored into a buffer memory 501. The data stored in the buffer memory 501 is read out by the CPU 504 and sent to a coder/decoder (CODEC) 502. The CODEC 502 decodes the data from the buffer memory 501 and forms a bit map image.

The formed bit map image is transferred to the image I/O controller 3 through the controller I/F 503 by the CPU 504. At this time, the CPU 504 transfers a control command for instructing an output destination, output setting, or the like of the image.

Upon facsimile transmission, the image data to be transmitted is inputted from the image I/O controller 3 through the controller I/F 503. The image data is transferred to the CODEC 502 by the CPU 504. The CODEC 502 encodes the image data inputted from the image I/O controller 3. The encoded image data is stored into the buffer memory 501. At this time, various setting information regarding the facsimile transmission such as a telephone number and the like is inputted from the image I/O controller 3 through the controller I/F 503. The various inputted setting information is transferred to the CPU 504 through the CPU bus 507. The CPU 504 executes various facsimile transmission settings on the basis of the various setting information from the image I/O controller 3, thereafter, reads out the data from the buffer memory 501, and transfers it to the MODEM 500. The MODEM 500 modulates the data read out from the buffer memory 501 and sends it to the TEL line 10.

The display picture plane and setting information regarding the operation of the facsimile 5 have been stored in a ROM 505 and a RAM 506. The CPU 504 reads them out as necessary and transfers them to the image I/O controller 3 through the controller I/F 503. The CPU 504 executes various controls on the basis of the operation information of the operation unit 6 transferred from the image I/O controller 3. For example, when the outputting operation of a communication administration report of the facsimile 5 is executed in the operation unit 6, the CPU 504 is notified of such a fact by the image I/O controller 3. The CPU 504 forms a bit map image of the communication administration report into the RAM 506 in accordance with the contents of the notification from the image I/O controller 3. The formed bit map image is transferred to the image I/O controller 3 through the controller I/F 503.

The control by the CPU 504 is executed in accordance with a control program stored in the ROM 505. The RAM 506 is used as work areas for an arithmetic operation, processes, and the like of the CPU 504.

As mentioned above, the processes in which the functions such as reading of the original image, print of the image, transmission and reception of the image, storage of the image, and the like are combined can be executed mainly by the image I/O controller 3.

An image input sequence of the formatter 4 and image I/O controller 3 in case of printing the PDL data from the host computer 9 will now be described with reference to FIG. 7. FIG. 7 is a diagram showing the image input sequence of the formatter 4 and image I/O controller 3 in the image processing apparatus of FIG. 1.

As shown in FIG. 7, when the formatter 4 interprets the PDL data from the host computer 9 and receives the data for instructing the start of a job, the formatter 4 sends a job start request command (START command) to the image I/O controller 3.

When the START command is received, the image I/O controller 3 discriminates whether this job can be accepted or not, and notifies the formatter 4 of a discrimination result by a STATUS command.

When the formatter 4 is notified of a fact that the job acceptance is OK by the STATUS command from the image I/O controller 3, the PDL data received from the host computer 9 is sequentially developed into a bit map image. When the bit map images of one page are formed, a page image output command (PAGE command) is sent to the image I/O controller 3.

If it is determined that the input of the page images can be accepted, the image I/O controller 3 returns OK to the formatter 4 by the STATUS command.

The formatter 4 which received the STATUS command of OK from the image I/O controller 3 reads out the bit map images of one page from the image memory 402 and video-transfers them to the image I/O controller 3.

The image I/O controller 3 ordinarily controls the printer 2 to print the image data inputted from the formatter 4 in accordance with a print mode designated by the START command. If the accumulated number of print papers reaches the preset maximum number of print papers during the execution of the job, the printing operation of the printer 2 is restricted. When the printing operation is restricted, whether a retreat mode for retreating the bit map images of the remaining pages after the page in which the printing operation has been restricted into the image memory 307 can be executed or not is discriminated. If the retreat mode can be executed, the bit map images of the remaining pages are stored into the image memory 307.

When the printing in the printer 2 is finished and the storage of the bit map images into the image memory 402 in the retreat mode is finished, the image I/O controller 3 notifies the formatter 4 of a result of the storage by the STATUS command.

In a manner similar to the above, each time the bit map images of one page are formed in the formatter 4, the foregoing page image transfer sequence is repeated.

When the formatter 4 interprets the PDL data from the host computer 9 and receives a command for instructing the end of the job or finishes the job during the execution of the job due to a reset or the like, the formatter sends a job end command (END command) to the image I/O controller 3. A series of jobs is finished.

The control commands which are transmitted and received between the formatter 4 and image I/O controller 3 and its data construction will now be described with reference to FIGS. 8A to 8D. FIGS. 8A to 8D are diagrams showing the control commands which are transmitted and received between the formatter 4 and image I/O controller 3 in the image processing apparatus in FIG. 1 and its data construction.

As shown in FIG. 8A, the START command indicative of the job start request includes "Job No.", "jobname", "username", and "Print mode". The "Job No." indicates a job identification number for identifying a job to be processed between the formatter 4 and image I/O controller 3. The "jobname" indicates a name which is used by the user to identify the job, that is, for example, the jobname is a document name which is added at a point when a document is formed on an application of the host computer 9, or the like. The "username" indicates a name of the user who executed the job on the host computer. The "Print mode" indicates a print mode for designating various print processing methods such as both-side print mode, sorting print mode, and the like.

As shown in FIG. 8B, the PAGE command indicative of the page image output includes "Job No.", "Page No.", and "Page size". The "Job No." indicates a job identification number. The "Page No." indicates a page number. The "Page Size" indicates a size (for example, A3, A4, etc.) of page image.

As shown in FIG. 8C, the END command indicative of the end of job includes "Job No." indicative of a job identification number and "Completion status". The "Completion Status" shows whether the job has successfully or unsuccessfully been finished in the formatter 4.

As shown in FIG. 8D, the STATUS command indicative of a status response which is notified to the formatter 4 from the image I/O controller 3 includes "Kind of status", "Status", and "Detail status". The "Kind of status" indicates the kind of status response. The "Status" indicates a status (OK, NG, etc.). The "Detail status" indicates a detailed status.

Figure 9:
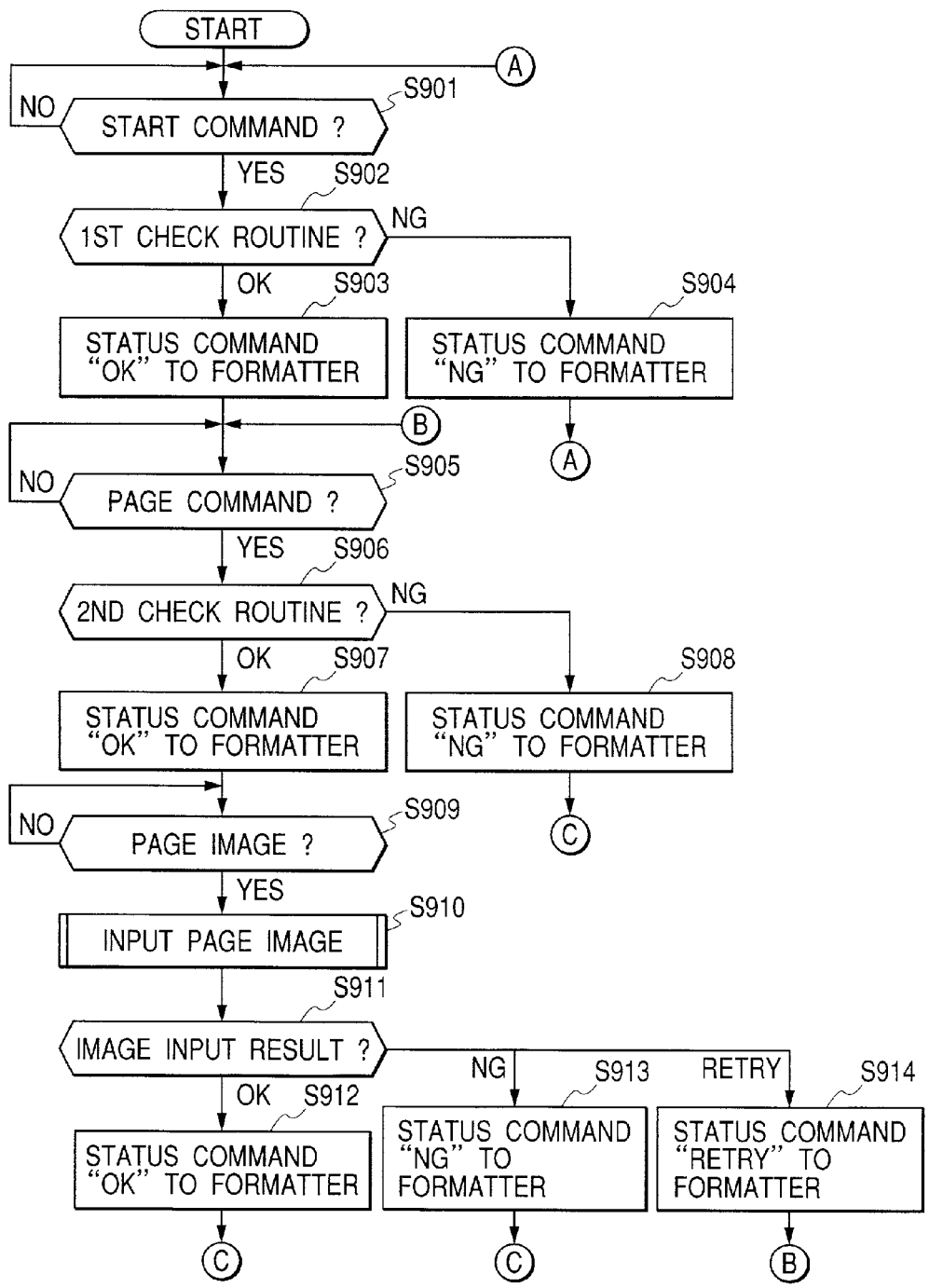
FIG. 9 is a flowchart showing a processing procedure corresponding to a job start request (START command) from the formatter 4 in the image I/O controller 3.
Figure 10:
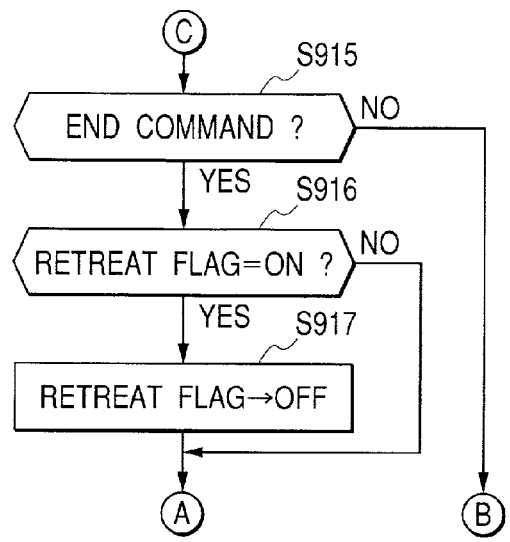
FIG. 10 is a flowchart showing the processing procedure corresponding to the job start request (START command) from the formatter 4 in the image I/O controller 3.
Figure 11:
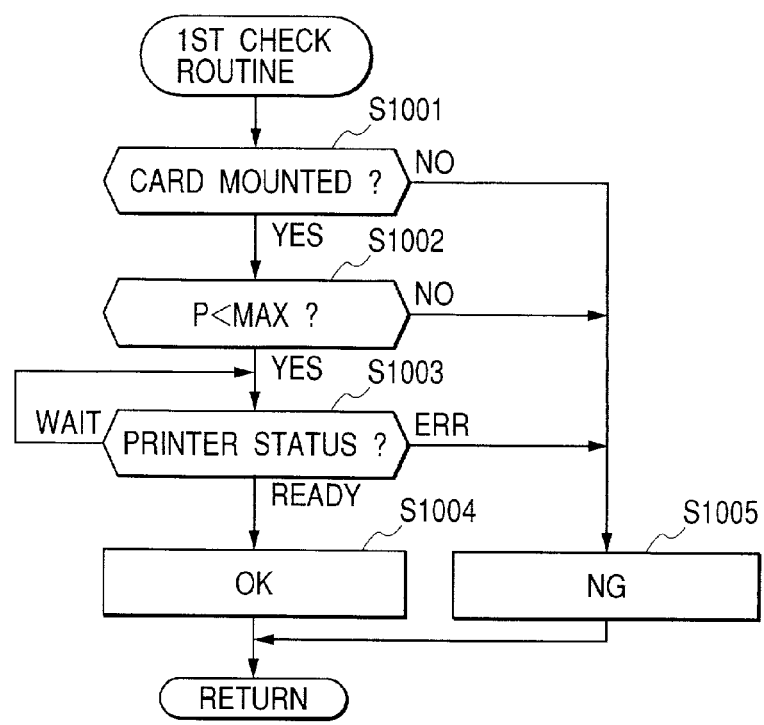
FIG. 11 is a flowchart showing a procedure for the first check routine.
Figure 12:
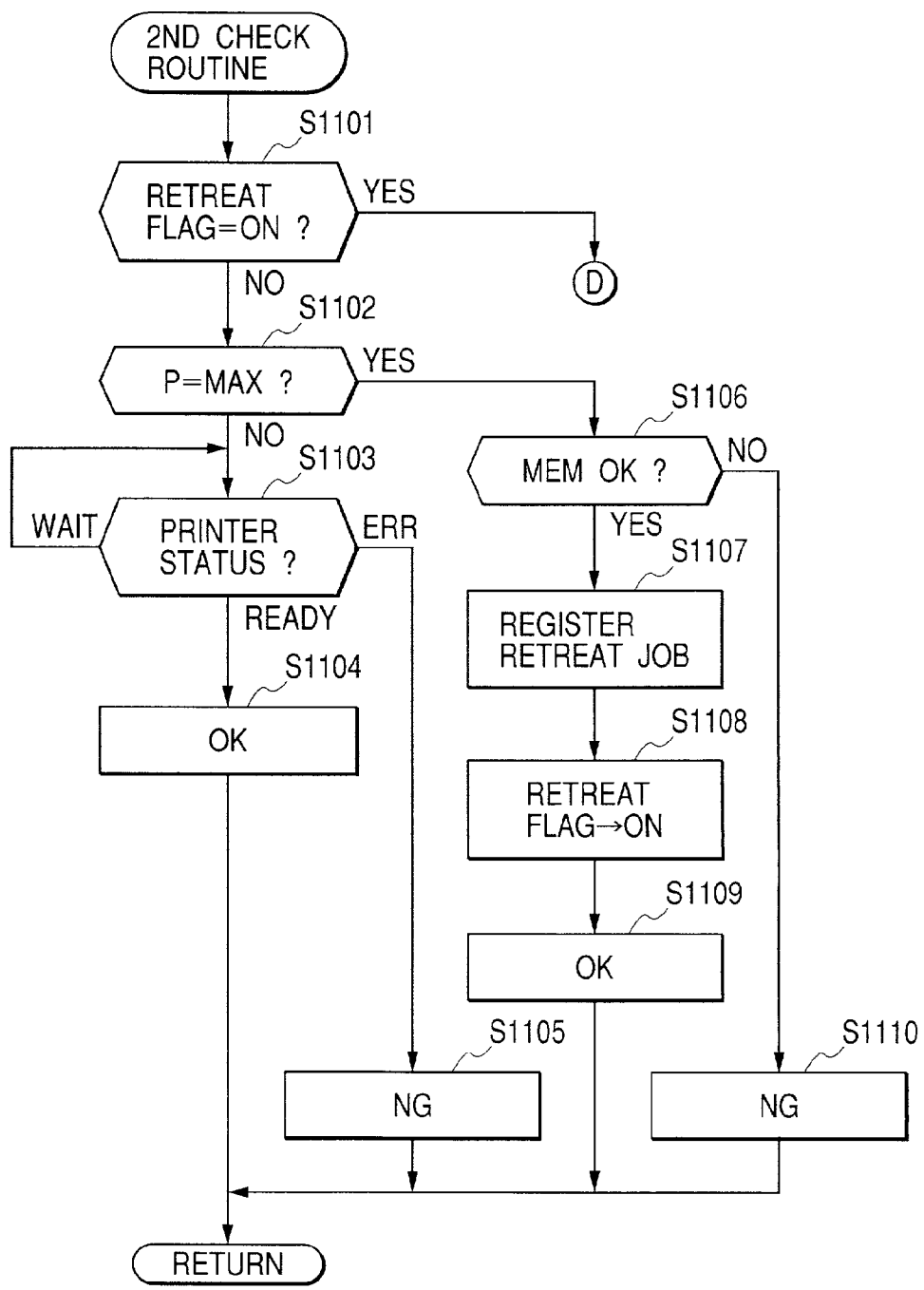
FIG. 12 is a flowchart showing a procedure for the second check routine.
Figure 13:
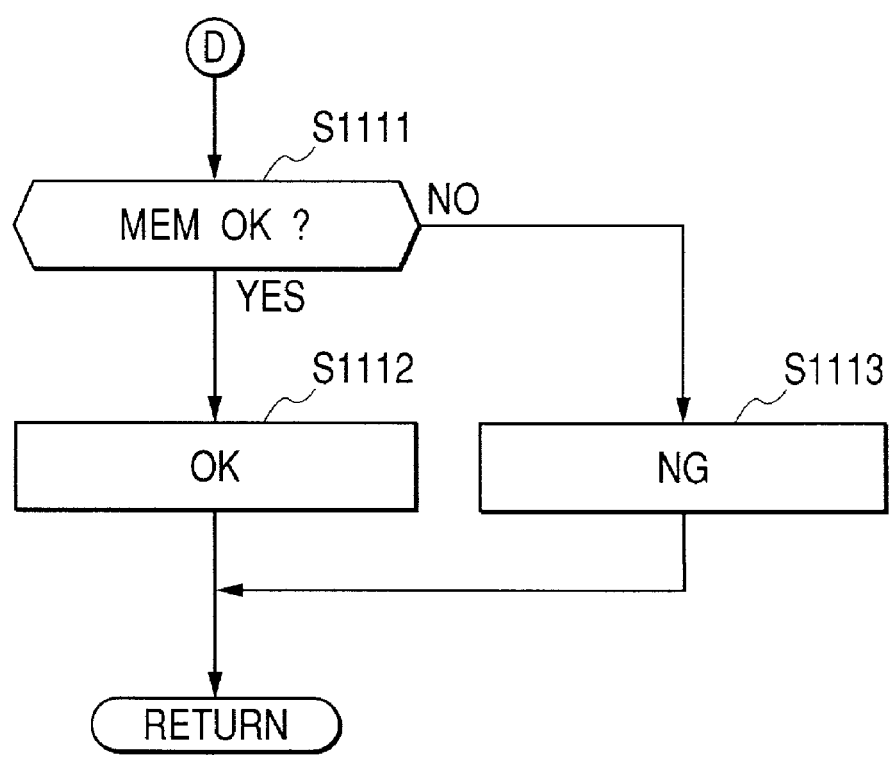
FIG. 13 is a flowchart showing the procedure for the second check routine.
Figure 14:
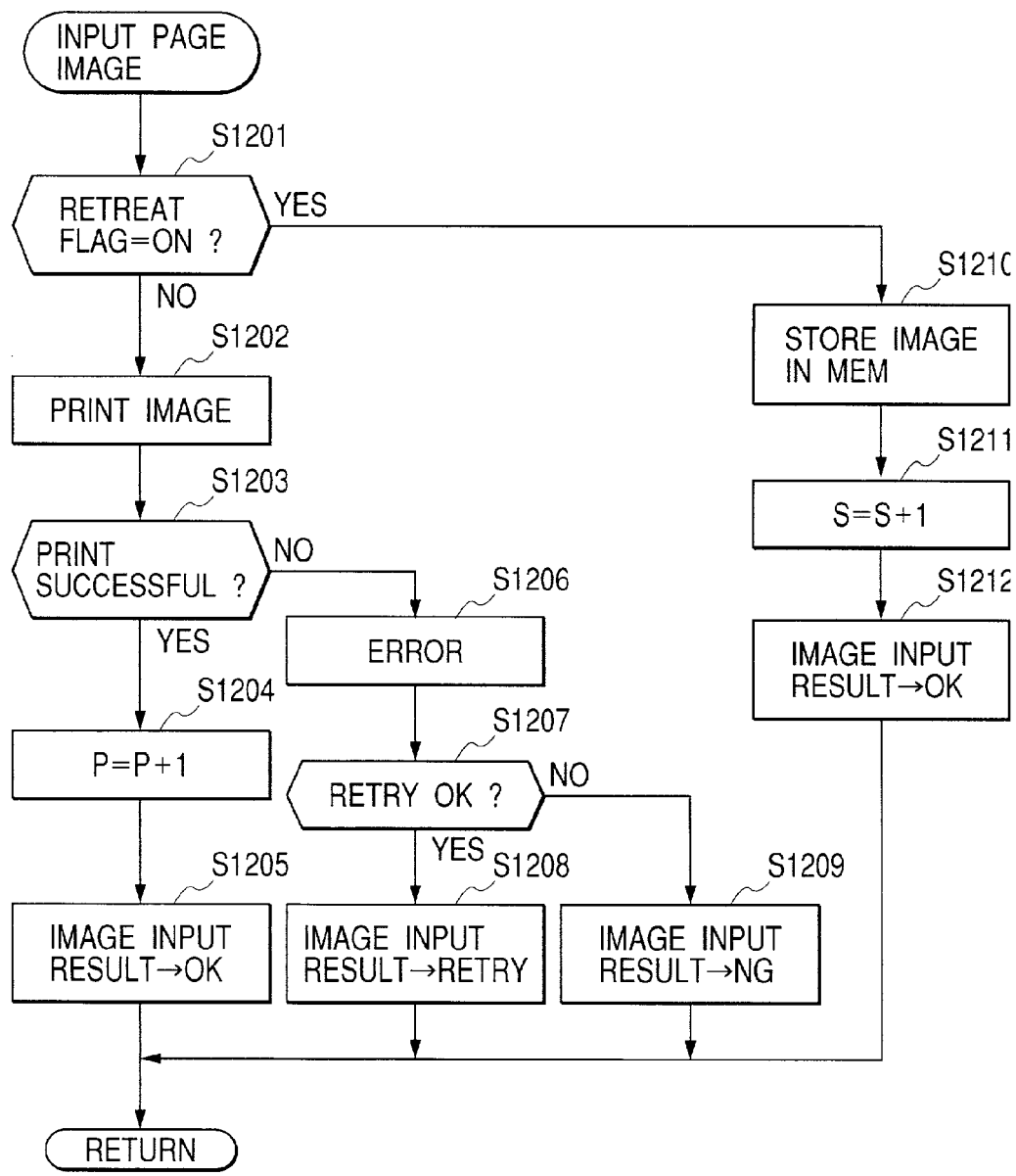
FIG. 14 is a flowchart showing a procedure for a page image inputting process.

Subsequently, processes in the case where the image I/O controller 3 receives the job start request (START command) from the formatter 4 will now be described with reference to FIGS. 9 to 15. FIGS. 9 and 10 are flowcharts showing a processing procedure for the job start request (START command) from the formatter 4 in the image I/O controller 3. FIG. 11 is a flowchart showing a procedure for the first check routine. FIGS. 12 and 13 are flowcharts showing a procedure for the second check routine. FIG. 14 is a flowchart showing a procedure for the page image inputting process. FIG. 15 is a diagram showing a construction of a retreat job table.

As shown in FIG. 9, in step S901, the image I/O controller 3 waits for the notification of the START command from the formatter 4. When the START command is notified, step S902 follows. A discrimination result of the first check routine for discriminating whether the job can be accepted or not is discriminated.

In the first check routine, as shown in FIG. 11, in step S1001, whether the control card 8 has been mounted or not is first discriminated. When the control card 8 is not mounted, since the acceptance of the job is not allowed, the processing routine advances to step S1005. The acceptance of the job is decided to be "NG" and the processing routine exits from this process.

When the control card 8 is mounted, step S1002 follows. The maximum number (MAX) of print papers and the accumulated number (P) of print papers which have been recorded in the control card 8 are read out and whether the relation of P<MAX is satisfied or not is discriminated. If the relation of P<MAX is not satisfied, since the acceptance of the job is not allowed, step S1005 follows. The acceptance of the job is decided to be "NG" and the processing routine exits from this process.

If the relation of P<MAX is satisfied, step S1003 follows. Whether the printer 2 is in a status where it can execute the printing or not is discriminated. In this step, whether the status of the printer 2 is one of a waiting status (WAIT) where the printer can be used after waiting for a predetermined time, an error status (ERR) where the printer cannot be used even after waiting for the predetermined time, and a status (READY) where the printer can be immediately used is discriminated. If it is determined that the status of the printer 2 is the WAIT status, the apparatus waits until the status of the printer 2 enters the READY status. If the status of the printer 2 is determined to be the ERR status, since the acceptance of the job is not allowed, step S1005 follows. The acceptance of the job is decided to be A "NG" and the processing routine exits from this process. If the status of the printer 2 is determined to be the READY status, since the acceptance of the job is allowed, step S1004 follows. The acceptance of the job is decided to be "OK" and the processing routine exits from this process.

When the discrimination result of the first check routine is "NG", step S904 follows and the STATUS command indicative of "NG" is returned to the formatter 4. The processing routine is returned to step S901.

When the discrimination result of the first check routine is "OK", the processing routine advances to step S903 and the STATUS command indicative of "OK" is returned to the formatter 4. The formatter 4 which received the STATUS command of "OK" develops the image data of one page and, thereafter, sends the PAGE command to the image I/O controller 3.

In step S905, the apparatus waits for the reception of the PAGE command from the formatter 4. When the PAGE command is received, a discrimination result of the second check routine for discriminating whether the page image can be accepted or not is discriminated.

In the second check routine, as shown in FIG. 12, whether a retreat flag is "ON" or not is discriminated in step S1101. The retreat flag is a flag showing whether the control mode is a retreat mode in which the image data inputted from the formatter 4 is retreated into the image memory 307 in the case where the accumulated number of print papers reached the maximum number of print papers during the execution of the job.

When the retreat flag is "OFF", since a normal print output is executed, step S1102 follows. Whether the accumulated number (P) of print papers coincides with the maximum number (MAX) of print papers or not is discriminated. If the accumulated number (P) of print papers does not coincide with the maximum number (MAX) of print papers, step S1103 follows. Whether the status of the printer 2 is one of the WAIT status, ERR status, and READY status is discriminated. When the status of the printer 2 is the WAIT status, the apparatus waits until it enters the READY status. When the status of the printer 2 is the READY status, the processing routine advances to step S1104. In step S1104, the acceptance of the page image is determined to be "OK" and the processing routine exits from this process.

In step S1103, if it is decided that the status of the printer 2 is the ERR status, the processing routine advances to step S1105. The acceptance of the page image is determined to be "NG" and the processing routine exits from this process.

If it is determined in step S1102 that the accumulated number (P) of print papers coincides with the maximum number (MAX) of print papers, it is necessary to retreat the image data of the subsequent pages in the job into the image memory 307 without print-outputting it. Therefore, step S1106 follows and whether an area for storing the image data can be assured in the image memory 307 or not is discriminated. When the storing area of the image data cannot be assured in the image memory 307, step S1110 follows, the acceptance of the page image is determined to be "NG", and the processing routine exits from this process.

If the storing area of the image data can be assured in the image memory 307, step S1107 follows and a retreat job is registered. In this job, information necessary at the time of printing the retreated job later is set into the retreat job table.

As shown in FIG. 15, "ID", "Job No.", "jobname", "username", "Pages(S)", and "Address" are registered into the retreat job table. The "ID" indicates an administration ID of the control card 8 mounted in the present card adaptor 7. The "Job No." indicates a job identification number. The "jobname" indicates a job name. The "username" indicates a user name. The "Pages(S)" indicates the total number of pages of the retreat job. At a point when the table is formed, "0" is set into "Pages(S)". The "Address" indicates an address in the image memory 307 to store the page images of the retreat job.

When the setting of the information into the retreat job table is finished, step S1108 follows and the retreat flag is set to "ON". In subsequent step S1109, the acceptance of the page image is determined to be "OK", and the processing routine exits from this process.

If it is decided in step S1101 that the retreat flag is "ON", since this means that the retreat Job has already been in the retreat mode, the processing routine advances to step S1111 shown in FIG. 13. Whether an area to store the image data can be assured in the image memory 307 or not is discriminated. If the area to store the image data cannot be assured in the image memory 307, step S1113 follows. The acceptance of the page image is determined to be "NG", and the processing routine exits from this process. If the area to store the image data can be assured in the image memory 307, step S1112 follows. The acceptance of the page image is determined to be "OK", and the processing routine exits from this process.

In step S906 (shown in FIG. 9), if it is determined that the discrimination result of the second check routine indicates that the acceptance of the page image is "OK", step S907 follows. The STATUS command of "OK" is returned to the formatter 4. In subsequent step S909, the apparatus waits for the input of the page image from the formatter 4. When the page image is inputted from the formatter 4, the processing routine advances to step S910 and the page image inputting process is executed.

In the page image inputting process, as shown in FIG. 14, first, in step S1201, whether the retreat flag is "ON" or not is discriminated. If the retreat flag is "OFF", step S1202 follows. The image data inputted from the formatter 4 is outputted to the printer 2. In the printer 2 which received the image data, the print output is executed.

Subsequently, step S1203 follows and whether the printing has successfully been finished or not is discriminated. If the printing has successfully been finished, step S1204 follows and "1" is added to the accumulated number (P) of print papers. Step S1205 follows, "OK" is set into a result of the page image inputting process, and the processing routine exits from this process.

If the printing is not successfully finished, step S1206 follows and an error process is executed. In next step S1207, whether the printing can be retried or not is discriminated. If the printing can be retried, step S1208 follows, "retry" is set into the result of the page image inputting process, and the processing routine exits from this process. If the printing cannot be retried, step S1209 follows, "NG" is set into the result of the page image inputting process, and the processing routine exits from this process.

If it is determined in step S1201 that the retreat flag is "ON", step S1210 follows. The image data inputted from the formatter 4 is stored into the image memory 307. In next step S1211, "1" is added to the total number (S) of retreat pages, "OK" is set into the result of the page image inputting process, and the processing routine exits from this process.

When the page image inputting process is finished, step S911 follows and the result of the page image inputting process is discriminated. If the result of the page image inputting process is "OK", step S912 follows and the STATUS command indicating that the result is "OK" is returned to the formatter 4. The processing routine advances to step S915 shown in FIG. 10.

In step S915, whether the END command has been inputted from the formatter 4 or not is discriminated. When the END command is not inputted, it is determined that there is an input of the next page image. The processing routine is returned to step S905. On the other hand, if the input of the END command exists, step S916 follows and whether the retreat flag is "ON" or not is discriminated. When the retreat flag is "ON", step S917 follows and the retreat flag is set to "OFF". The processing routine is returned to step S901. When the retreat flag is "OFF", step S917 is skipped and the processing routine is returned to step S901.

If it is decided in step S911 that the result of the page image inputting process is "NG", step S913 follows. The STATUS command showing that the result is "NG" is returned to the formatter 4. The formatter 4 to which the STATUS command of "NG" has been returned executes an error process and, thereafter, sends the END command. Therefore, the processing routine advances to step S915 shown in FIG. 10. The apparatus waits for the END command from the formatter 4.

If it is determined in step S911 that the result of the page image inputting process is "retry", step S914 follows and the STATUS command showing that the result is "retry" is returned to the formatter 4. The processing routine is returned to step S905 and the apparatus waits for the transmission of the next PAGE command.

If it is decided in step S906 that the result of the second check routine is "NG", step S908 follows. The STATUS command showing that the result is "NG" is returned to the formatter 4. The formatter 4 to which the STATUS command of "NG" has been returned executes the error process and, thereafter, sends the END command. Therefore, the processing routine advances to step S915 shown in FIG. 10 and the apparatus waits for the END command from the formatter 4.

When the accumulated number (P) of print papers reaches the maximum number (MAX) of print papers and the printing operation is interrupted as mentioned above, the operating mode is set to the retreat mode. The page images inputted from the formatter 4 after the printing operation was interrupted can be retreated into the image memory 307.

Figure 17:
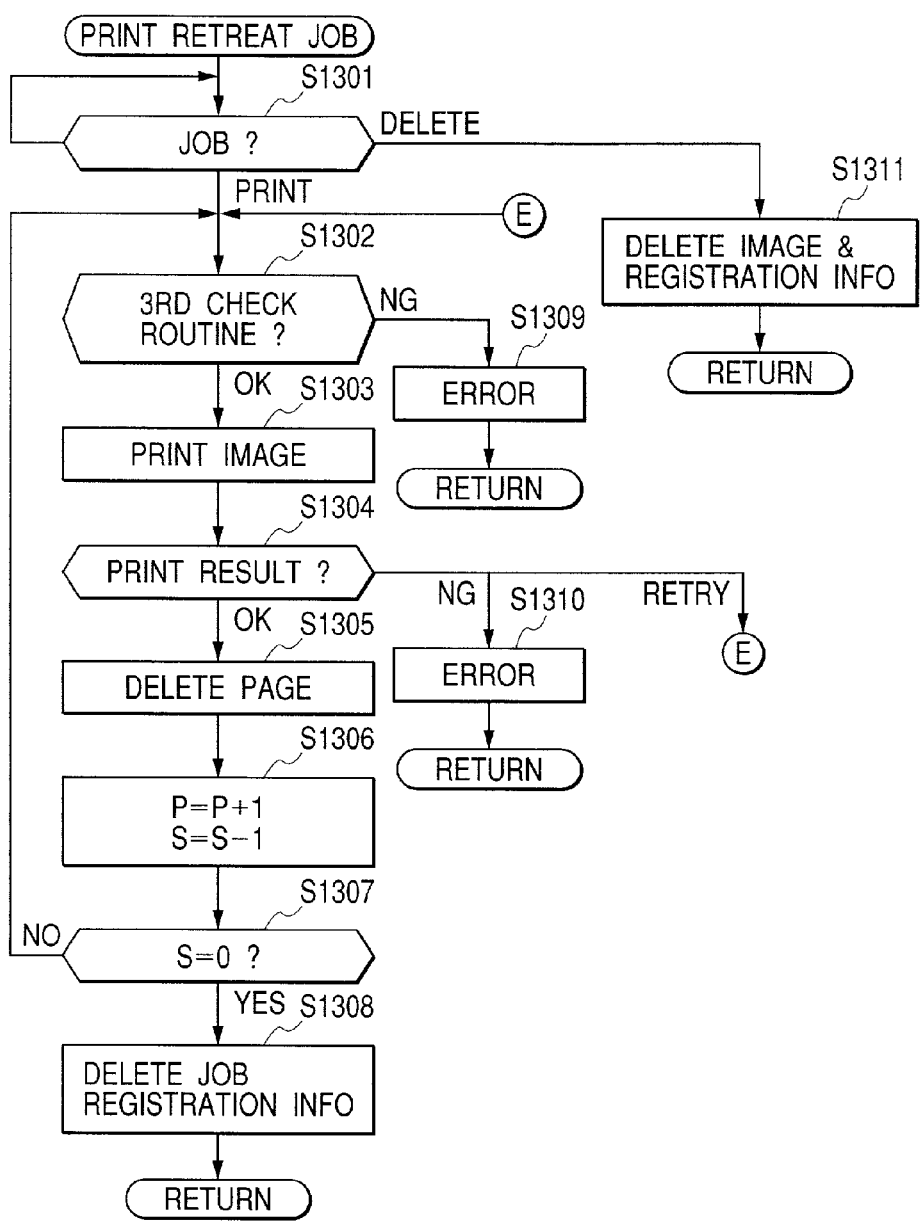
FIG. 17 is a flowchart showing a retreat job printing process in the image processing apparatus in FIG. 1.
Figure 18:
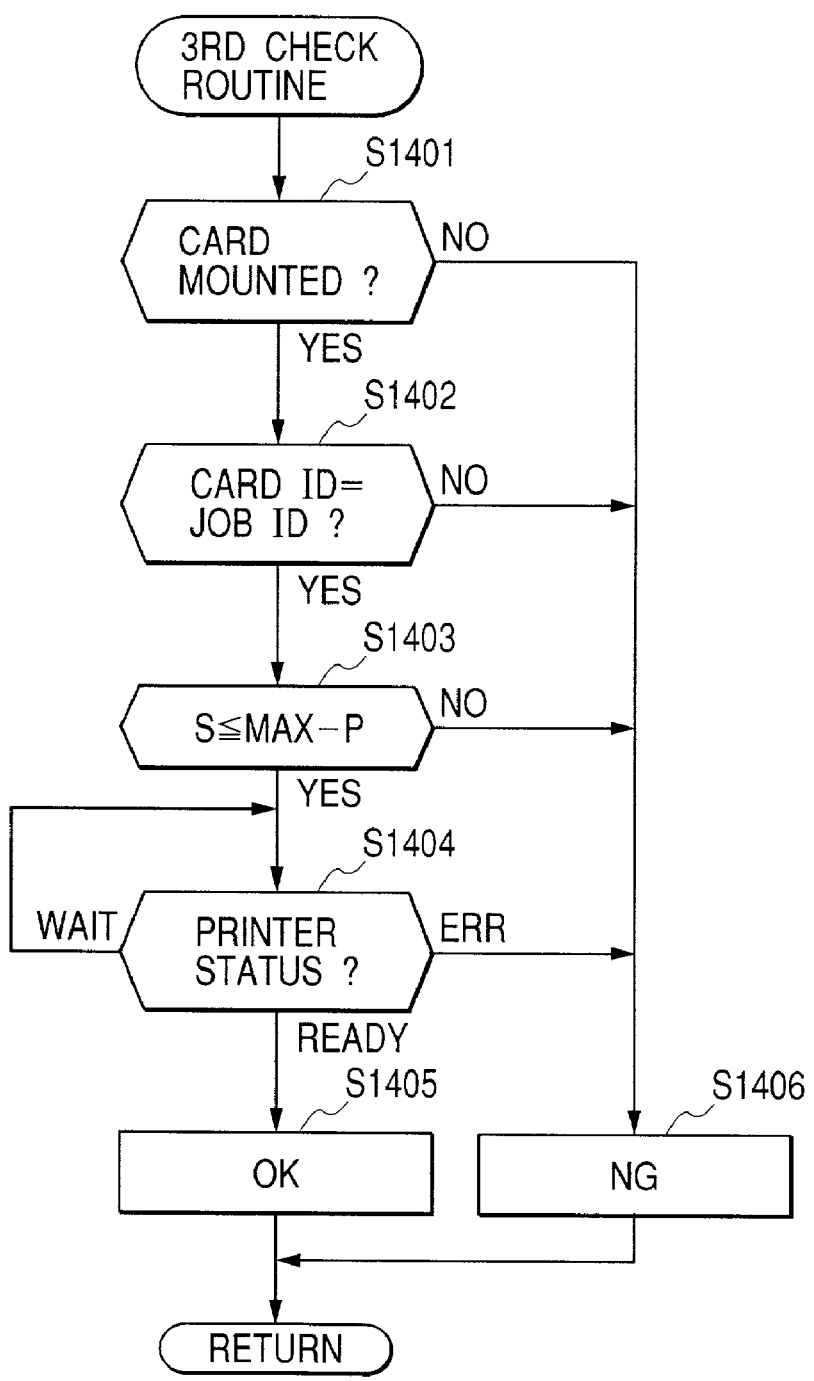
FIG. 18 is a flowchart showing a procedure for the third check routine.

Processes for printing the retreat job registered in the retreat job table will now be described with reference to FIGS. 16 to 18. FIG. 16 is a diagram showing an example of a retreat job list picture plane which is displayed on the operation unit 6 in the image processing apparatus in FIG. 1. FIG. 17 is a flowchart showing a retreat job printing process of the image processing apparatus in FIG. 1. FIG. 18 is a flowchart showing a procedure for the third check routine.

When the accumulated number (P) of print papers reaches the maximum number (MAX) of print papers and the printing operation is interrupted, the interruption of the printing operation can be cancelled by an administrator of the apparatus. After the cancellation, whether the retreat job has been registered in the retreat job table or not is discriminated by the image I/O controller 3. If the retreat job has been registered in the retreat job table, the retreat job list picture plane as shown in FIG. 16 is displayed on the operation unit 6. On the retreat job list picture plane, to specify the retreat job, its ID (administration ID of the control card), a job name, a user name, and the total number of pages of the retreat job are displayed every retreat job. On the retreat job list picture plane, a desired retreat job is designated and the print or deletion can be selected with respect to the designated retreat job.

In the printing or deleting process of the retreat job registered in the retreat job table, as shown in FIG. 17, whether the print has been selected or the deletion has been selected with respect to the designated retreat job on the retreat job list picture plane is first discriminated in step S1301. When the deletion of the designated retreat job is selected, step S1311 follows. All of the page image data of the designated retreat job is deleted from the image memory 307. The registration information regarding the retreat job is deleted from the retreat job table, and the processing routine exits from this process.

When the print of the designated retreat job is selected, step S1302 follows. A discrimination result of the third check routine for discriminating whether the print of the designated retreat job can be performed or not is discriminated.

In the third check routine, as shown in FIG. 18, first, whether the control card 8 has been mounted or not is discriminated in step S1401. When the control card 8 is not mounted, since the print of the retreat job is not allowed, step S1406 follows. The print of the retreat job is determined to be "NG" and the processing routine exits from this process.

When the control card 8 is mounted, step S1402 follows and whether the ID recorded in the control card 8 coincides with the ID of the designated retreat job or not is discriminated. When they do not coincide, since the print of the retreat job is not allowed, step S1406 follows. The print of the retreat job is determined to be "NG" and the processing routine exits from this process.

When both of them coincide, step S1403 follows and whether the relation of S (the total number of pages of the designated retreat job)≦MAX (the maximum number of print papers)−P (the accumulated number of print papers) is satisfied or not is discriminated. When the relation of S≦MAX−P is not satisfied, the relation of P=MAX is satisfied during the printing of the designated retreat job and the printing operation is interrupted. Therefore, step S1406 follows and since the print of the retreat job is not allowed. The print of the retreat job is determined to be "NG" and the processing routine exits from this process.

When the relation of S≦MAX−P is satisfied, step S1404 follows and whether the printer 2 is in a status where it can execute the print or not is discriminated. In this case, whether the status of the printer 2 is one of the WAIT status, ERR status, and READY status is discriminated. If it is determined that the status of the printer 2 is the WAIT status, the apparatus waits until the status of the printer 2 enters the READY status. If it is determined that the status of the printer 2 is the ERR status, since the print of the retreat job is not allowed, step S1406 follows. The print of the retreat job is determined to be "NG" and the processing routine exits from this process.

If it is determined that the status of the printer 2 is the READY status, since the acceptance of the retreat job is allowed, step S1405 follows. The acceptance of the retreat job is determined to be "OK" and the processing routine exits from this process.

When the discrimination result of the third check routine executed as mentioned above is "NG", step S1309 follows and the error process is executed and the processing routine exits from this process. When the discrimination result of the third check routine executed as mentioned above is "OK", step S1303 follows and the image data of the first page of the designated retreat job is read out from the image memory 307 and transferred to the printer 2. The printer 2 which received the image data executes the print output.

Subsequently, step S1304 follows and a result of the print-out is discriminated. Although the print is not successfully finished, if the retry is possible, the processing routine is returned to step S1302. The print of the relevant page is retried. If the print is not successfully finished and the retry is impossible, step S1310 follows and the error process is executed. The processing routine exits from this process.

When the print is successfully finished, step S1305 follows and the image data of the relevant page is deleted from the image memory 307. In next step S1306, "1" is added to the accumulated number (P) of print papers and "1" is subtracted from the total number (S) of pages of the designated retreat job. In step S1307, whether the total number (S) of pages of the designated retreat job is equal to "0" or not is discriminated. If the total number (S) of pages is not equal to "0", the processing routine is returned to step S1302 and the next page is printed. When the total number (S) of pages is equal to "0", that is, if the print of all of the pages of the designated retreat job is finished, step S1308 follows. The registration information of the designated retreat job is deleted from the retreat job table and the processing routine exits from this process.

As mentioned above, when the corresponding retreat job exists in the retreat job list displayed on the operation unit 6, the corresponding retreat job can be selected and the print output can be performed. If the retreat job which doesn't need to be printed has been registered, this retreat job can be also deleted.

Second Embodiment

Figure 19:
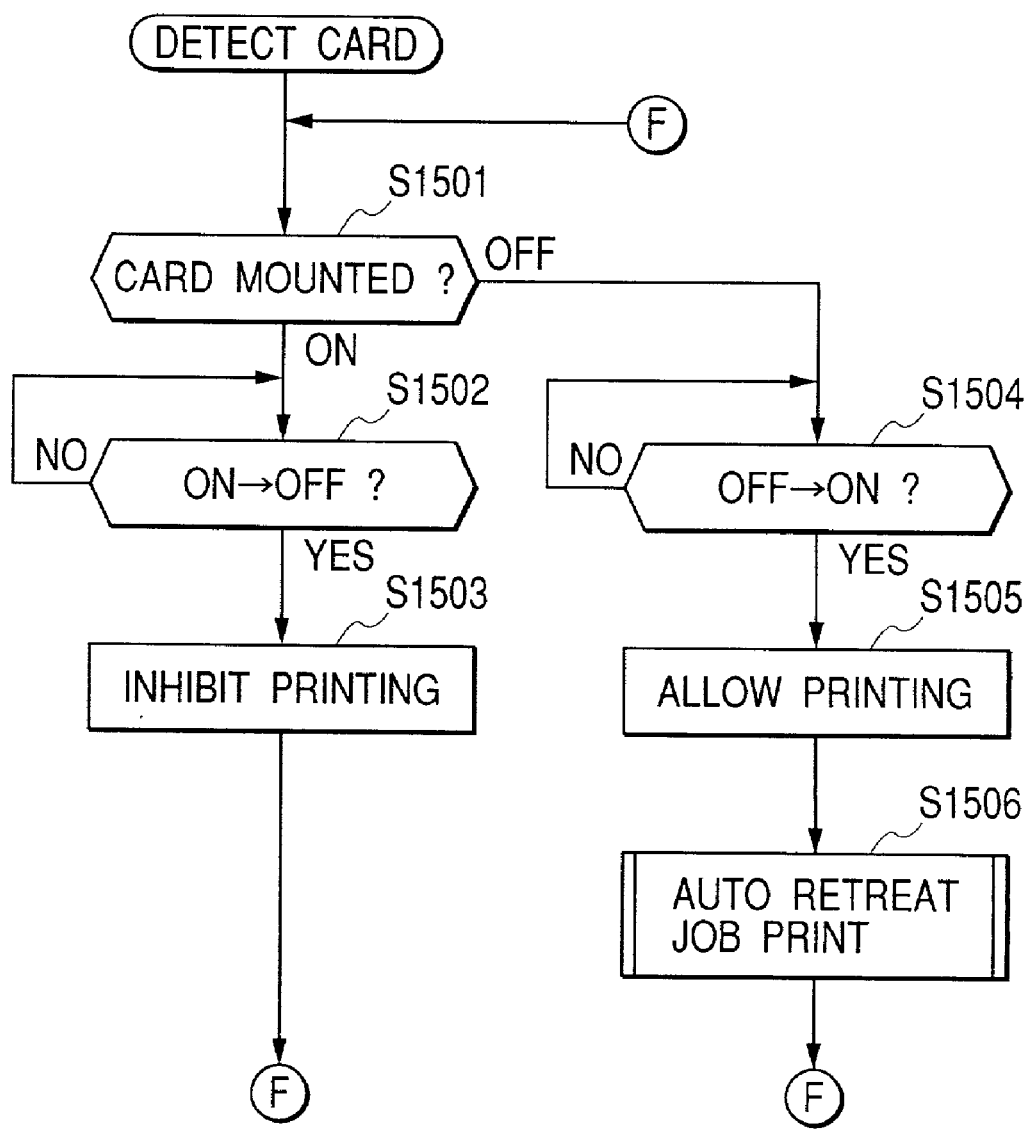
FIG. 19 is a flowchart showing a procedure for a card detecting process in the image processing apparatus according to the second embodiment of the invention.
Figure 20:
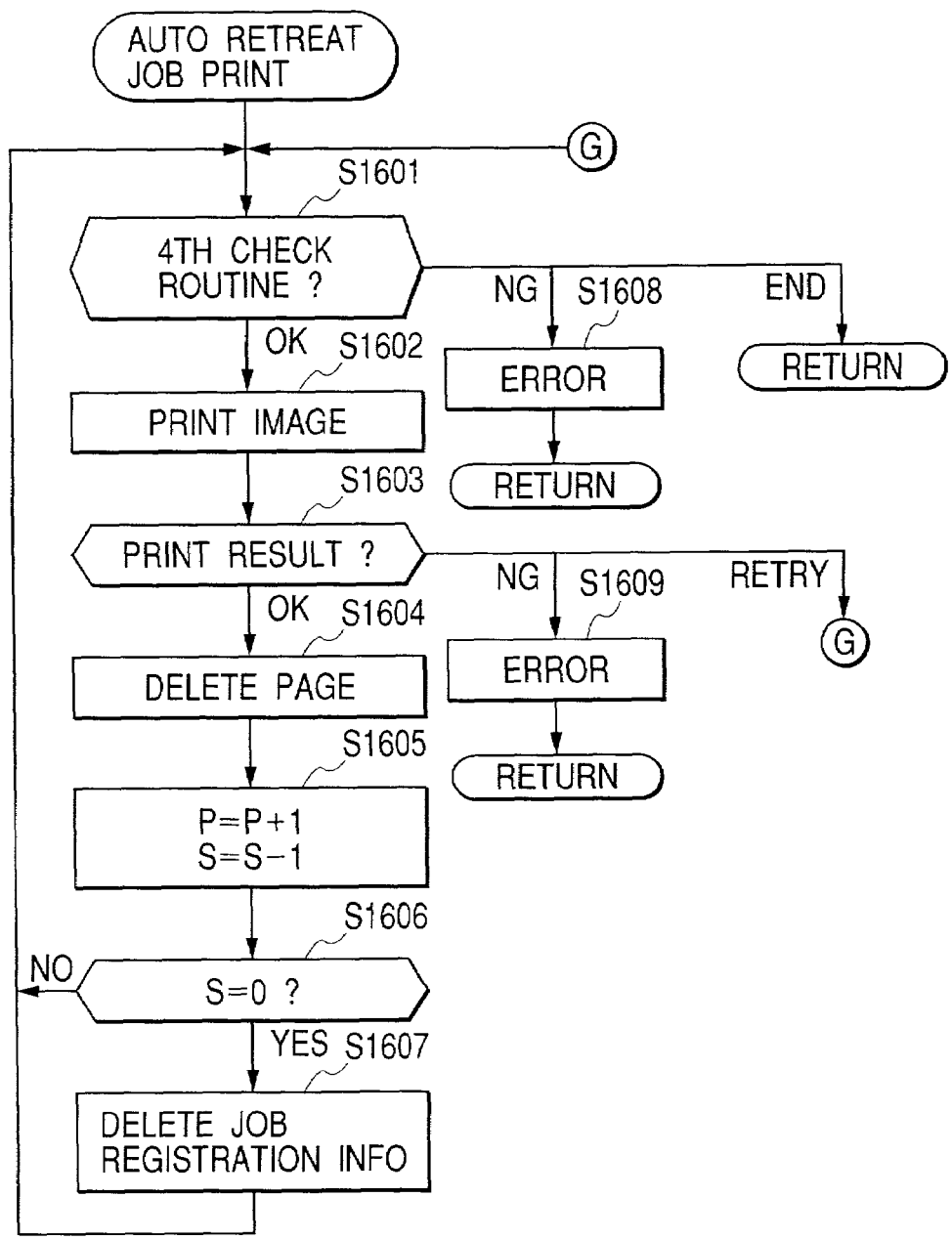
FIG. 20 is a flowchart showing a procedure corresponding to an auto retreat job printing process in the image processing apparatus according to the second embodiment of the invention.
Figure 21:
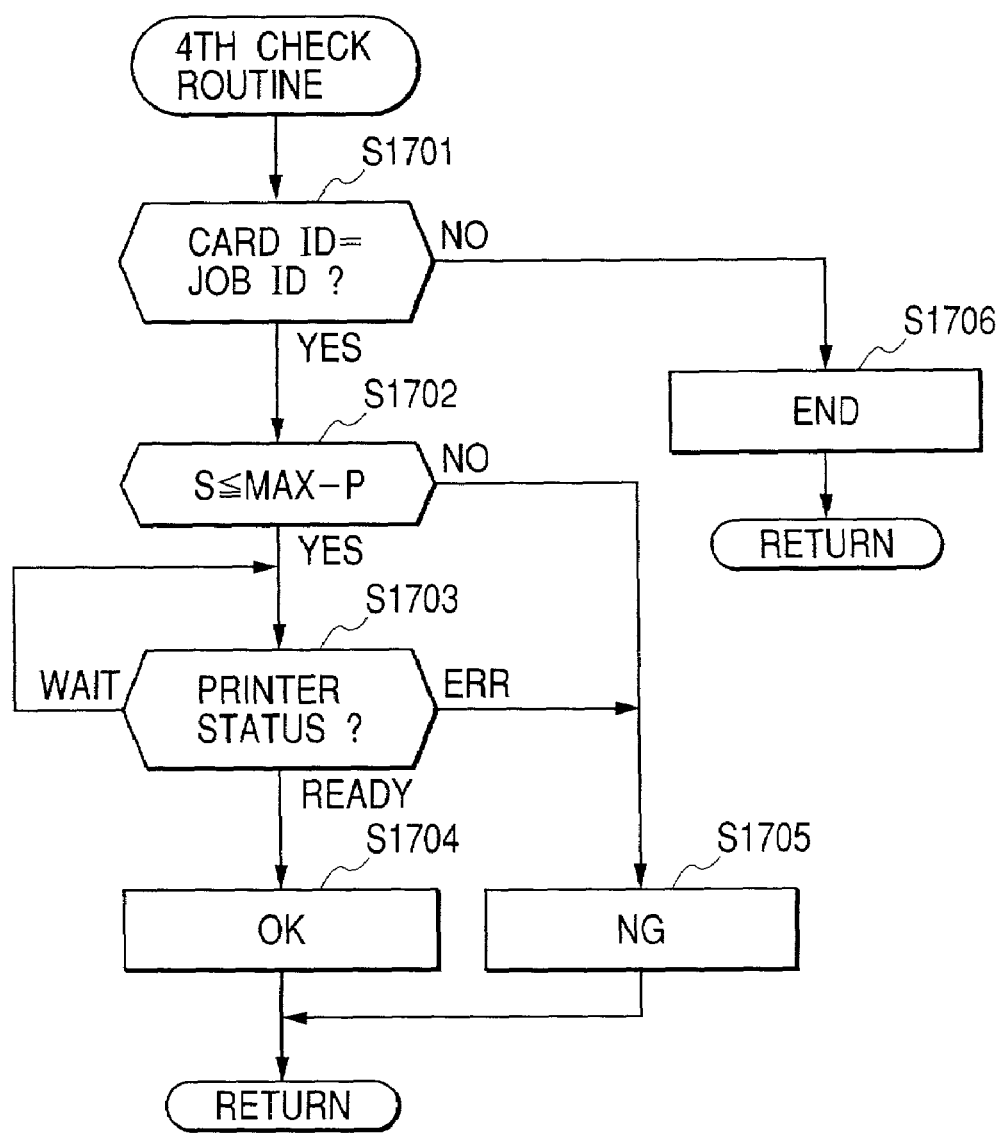
FIG. 21 is a flowchart showing a procedure for the fourth check routine of the image processing apparatus according to the second embodiment of the invention.

The second embodiment of the invention will now be described with reference to FIGS. 19 to 21. FIG. 19 is a flowchart showing a procedure for a card detecting process in an image processing apparatus according to the second embodiment. FIG. 20 is a flowchart showing a procedure for an auto retreat job printing process in the image processing apparatus according to the second embodiment. FIG. 21 is a flowchart showing a procedure for a fourth check routine of the image processing apparatus according to the second embodiment.

The second embodiment has substantially the same construction as that of the foregoing first embodiment and a description of the construction is omitted. According to the second embodiment, when the accumulated number (P) of print papers reaches the maximum number (MAX) of print papers during the execution of the print job, the retreat mode is executed in substantially the same manner as that in the first embodiment.

In the embodiment, when the control card 8 is mounted, the presence or absence of the retreat job of the ID which coincides with the administration ID recorded in the control card 8 is discriminated. If the retreat job exists, the print of the retreat job is automatically executed by the image I/O controller 3.

In the embodiment, first, a card detecting process for detecting the mounting state of the control card 8 is executed.

In the card detecting process, as shown in FIG. 19, the mounting state of the control card 8 is first discriminated on the basis of the information notified from the card adaptor 7 in step S1501. When the control card 8 is mounted (ON), step S1502 follows. The apparatus waits for the removal of the control card 8 from the card adaptor 7 while monitoring the information notified from the card adaptor 7. That is, the apparatus waits until the notification information from the card adaptor 7 is switched from ON to OFF. When the control card 8 is removed from the card adaptor 7, step S1503 follows and a print inhibiting status is set. The processing routine is returned to step S1501.

If it is determined in step S1501 that the control card 8 is not mounted (OFF), step S1504 follows. The apparatus waits until the control card 8 is mounted into the card adaptor 7 while monitoring the information notified from the card adaptor 7. That is, the apparatus waits until the notification information from the card adaptor 7 is switched from OFF to ON. When the control card 8 is mounted into the card adaptor 7, step S1505 follows and a print allowable status is set. In next step S1506, the auto retreat job printing process is executed and the processing routine is returned to step S1501.

In the auto retreat job printing process, as shown in FIG. 20, a discrimination result of the fourth check routine is first discriminated in step S1601.

In the fourth check routine, as shown in FIG. 21, the presence or absence of the retreat job of the ID which coincides with the administration ID recorded in the control card 8 is first discriminated with reference to the retreat job table in step S1701. When the retreat job of the ID which coincides with the administration ID does not exist, step S1706 follows. "END" is set into a discrimination result and the processing routine exits from this process.

If the retreat job of the ID which coincides with the administration ID exists, step S1702 follows. Whether the relation of S (the total number of pages of the designated retreat job)≦MAX (the maximum number of print papers)−P (the accumulated number of print papers) is satisfied or not is discriminated. When the relation of S≦MAX−P is not satisfied, the relation of P=MAX is satisfied during the printing of the retreat job of the ID which coincides with the administration ID and the printing operation is interrupted. Therefore, step S1705 follows, "NG" is set into the discrimination result, and the processing routine exits from this process.

When the relation of S≦MAX−P is satisfied, step S1703 follows and whether the printer 2 is in a status where it can execute the print or not is discriminated. In this case, whether the status of the printer 2 is one of the WAIT status, ERR status, and READY status is discriminated. If it is determined that the status of the printer 2 is the WAIT status, the apparatus waits until the status of the printer 2 enters the READY status. If it is determined that the status of the printer 2 is the ERR status, the print of the retreat job is not allowed. Therefore, step S1705 follows, "NG" is set into the discrimination result, and the processing routine exits from this process.

If it is determined that the status of the printer 2 is the READY status, the acceptance of the retreat job is allowed. Therefore, step S1704 follows, "OK" is set into the discrimination result, and the processing routine exits from this process.

When the discrimination result of the fourth check routine performed as mentioned above is "END", since there is no retreat job to be printed, the processing routine exits from this process. When the discrimination result of the fourth check routine is "NG", step S1608 follows, the error process is executed, and the processing routine exits from this process. When the discrimination result of the fourth check routine is "OK", step S1602 follows. The image data of the first page of the retreat job of the ID which coincides with the administration ID is read out from the image memory 307 and transferred to the printer 2. In the printer 2 which received the image data, the print output is performed.

Subsequently, step S1603 follows and a result of the print-out is discriminated. Although the print is not successfully finished, if the retry is possible, the processing routine is returned to step S1601 and the relevant page is printed again. If the print is not successfully finished and the retry is impossible, the processing routine advances to step S1609. The error process is executed and the processing routine exits from this process.

When the print is successfully finished, step S1604 follows and the relevant page is deleted from the image memory 307. In step S1605, "1" is added to the accumulated number (P) of print papers and "1" is subtracted from the total number (S) of pages of the retreat job. In step S1606, whether the designated total number (S) of pages is equal to "0" or not is discriminated. If the total number (S) of pages is not equal to "0", the processing routine is returned to step S1601 and the next page is printed. If the total number (S) of pages is equal to "0", that is, when the print of all of the pages of the retreat job is finished, step S1607 follows. The registration information of the retreat job of the ID which coincides with the administration ID is deleted from the retreat job table and the processing routine is returned to step S1601. If the next retreat job to be printed exists, the printing process regarding this retreat job is executed.

In the above process, with respect to the retreat job which was determined to be "NG" and is not printed, in a manner similar to the first embodiment, it is possible to display the retreat job list onto the operation unit 6, select the retreat job from the retreat job list, and print it. There is also a case where the retreat job which was not printed at the previous time can be printed by mounting the control card 8 again and executing the auto retreat job printing process.

As mentioned above, by mounting the control card 8, the retreat job of the ID which coincides with the administration ID is printed by the auto retreat job printing process. Therefore, the image data of the subsequent pages whose printing operation has been restricted can be printed without any troublesomeness.

Figure 22:
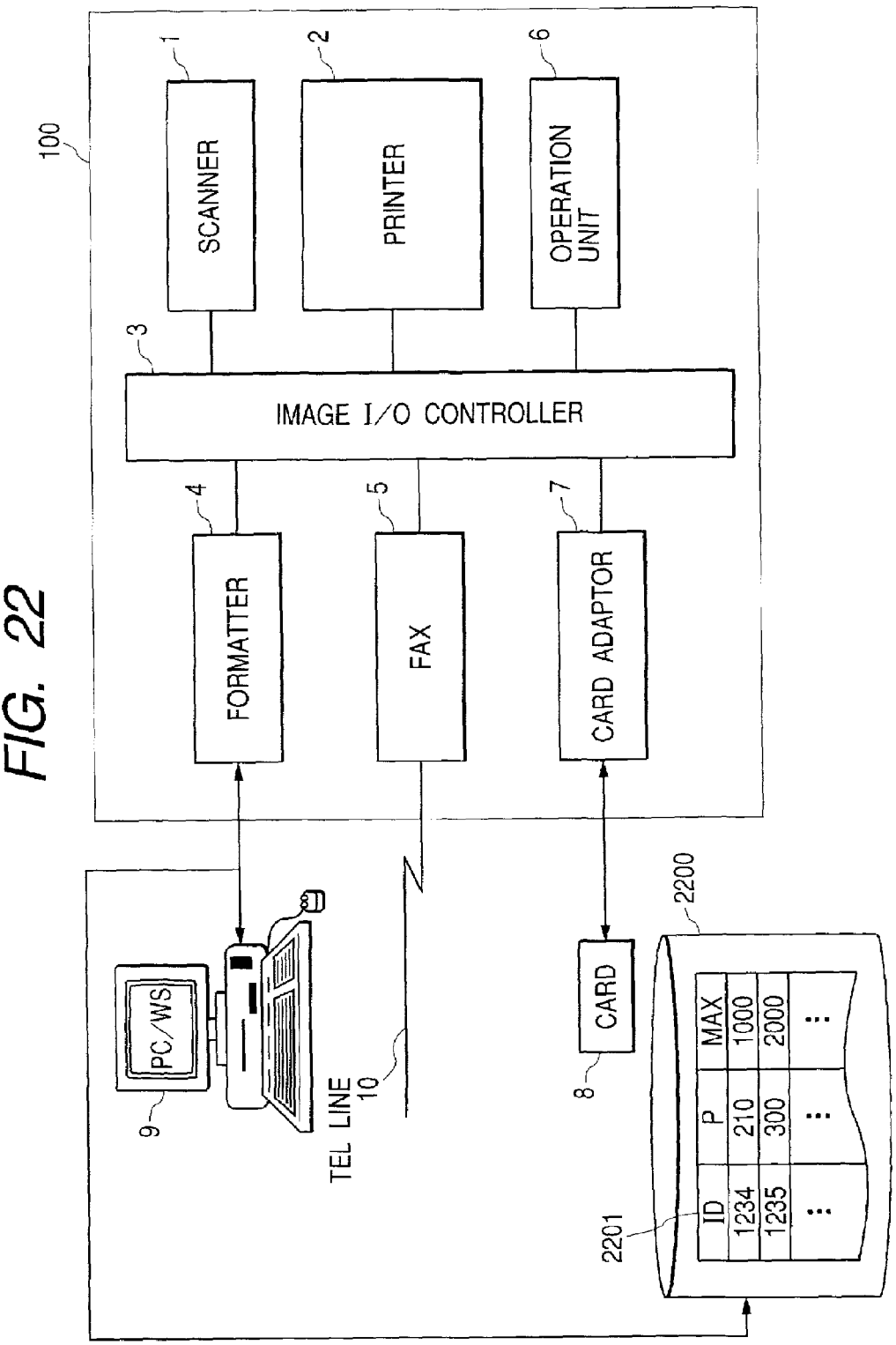
FIG. 22 is a constructional diagram for explaining another embodiment.

Although the accumulated number (P) of print papers and the maximum number (MAX) of print papers have been stored into the control card 8 in the embodiment, as shown in FIG. 22, they can be also stored as data 2201 corresponding to each administration ID into an administration computer 2200 on the network.

In this case, the administration computer 2200 transmits and receives data to/from the image processing apparatus 100 and the host computer in order to administrate the output in the image processing apparatus 100.

Although the administration ID in the embodiment has been used as an ID for administrating the output restriction of each division, naturally, it can be also used as an ID for administrating the output restriction of each person.

As described above, according to the image processing apparatus of the invention, the apparatus has: the memory means for storing the image data; restricting means for restricting the printing operation of the printing means when a predetermined condition is satisfied; and control means for controlling in a manner such that when the printing operation of the printing means is restricted by the restricting means during the execution of the print job including the print data of a plurality of pages, the image data obtained by developing the print data of the subsequent pages in which the printing operation has been restricted is stored into the memory means. Therefore, the print of the image data obtained by developing the print data of the subsequent pages in which the printing operation has been restricted can be restarted without any troublesomeness.

When the image data stored in the memory means is selected by the selecting means, by controlling the printing means so as to print the selected image data, the print of the image data obtained by developing the print data of the subsequent pages in which the printing operation has been restricted can be easily executed.

Further, when the restriction of the printing operation of the printing means is cancelled, whether the printable image data has been stored in the memory means or not is discriminated. By controlling the printing means so as to print the printable image data stored in the memory means in accordance with the discrimination result, the print of the image data obtained by developing the print data of the subsequent pages in which the printing operation has been restricted can be executed without performing the user operation.

What is claimed is:

1. A print control apparatus having developing means for developing print data into image data which can be print-processed and printing means for printing an image represented by the image data developed by the developing means onto a paper, comprising:

memory means for storing the image data;

first determination means for determining whether a predetermined condition is satisfied for execution of a print job including print data of a plurality of pages;

control means for controlling such that when said first determination means determines that the predetermined condition is satisfied, the image data obtained by developing the print data after the predetermined condition is satisfied is stored into said memory means; and second determination means for determining whether the image data which can be print-processed is stored in said memory means, when the predetermined condition is removed, wherein said control means controls, in response to a selection of at least one print job from a job list indicating the image data which can be print-processed, printing of the image data of the selected at least one print job in accordance with a determination result obtained by said second determination means.

2. An apparatus according to claim 1, wherein whether the predetermined condition is satisfied or removed is determined based on an administration ID.

3. An apparatus according to claim 1, further comprising a counter for accumulatively counting the number of print papers printed by the printing means, wherein said first determination means determines that the predetermined condition is satisfied when the number of print papers counted by said counter reaches a preset maximum number of print papers.

4. A print control method of a print control apparatus having developing means for developing print data into image data which can be print-processed and printing means for printing an image represented by the image data developed by the developing means onto a paper, comprising the steps of:

storing the image data in memory means;

determining in a first determination step whether a predetermined condition is satisfied for execution of a print job including print data of a plurality of pages;

controlling such that when said first determination step determines that the predetermined condition is satisfied, the image data obtained by developing the print data after the predetermined condition is satisfied is stored into the memory means; and determining in a second determination step whether the image data which can be print-processed is stored in the memory means, when the predetermined condition is removed, wherein said control step controls, in response to a selection of at least one print job from a job list indicating the image data which can be print-processed, printing of the image data of the selected at least one print job in accordance with a determination result obtained in said second determination step.

5. A method according to claim 4, wherein whether the predetermined condition is satisfied or removed is determined based on an administration ID.

6. A method according to claim 4, further comprising the step of accumulatively counting the number of print papers printed by the printing step, wherein said first determination step determines that the predetermined condition is satisfied when the number of print papers counted in said counting step reaches a preset maximum number of print papers.

7. A computer-readable medium storing a computer program which is executed by a computer of a print control apparatus having developing means for developing print data into image data which can be print-processed and printing means for printing an image represented by the image data developed by the developing means onto a paper, comprising the steps of:

storing the image data in memory means;

determining in a first determination step whether a predetermined condition is satisfied for execution of a print job including print data of a plurality of pages;

controlling such that when said first determination step determines that the predetermined condition is satisfied, the image data obtained by developing the print data after the predetermined condition is satisfied is stored into the memory means; and determining in a second determination step whether the image data which can be print-processed is stored in the memory means, when the predetermined condition is removed, wherein said control step controls, in response to a selection of at least one print job from a job list indicating the image data which can be print-processed, printing of the image data of the selected at least one print job in accordance with a determination result obtained in said second determination step.

* * * * *

UNITED STATES PATENT AND TRADEMARK OFFICE
CERTIFICATE OF CORRECTION

PATENT NO. : 7,095,515 B2 Page 1 of 1
APPLICATION NO. : 09/905884
DATED : August 22, 2006
INVENTOR(S) : Iwadate It is certified that error appears in the above-identified patent and that said Letters Patent is hereby corrected as shown below:

ON THE TITLE PAGE, AT ITEM (30):
Foreign Application Priority Data, "2000/220525" should read --2000-220525--.

COLUMN 9:
Line 50, "A "NG"" should read --"NG"--.

COLUMN 10:
Line 64, "Job" should read --job--.

Signed and Sealed this

Twenty-seventh Day of May, 2008

JON W. DUDAS
*Director of the United States Patent and Trademark Office*